(12) United States Patent
Nakajima et al.

(10) Patent No.: US 7,242,442 B2
(45) Date of Patent: Jul. 10, 2007

(54) ACTIVE MATRIX SUBSTRATE, DISPLAY APPARATUS, AND METHOD FOR PRODUCING THE SAME

(75) Inventors: Mutsumi Nakajima, Nara (JP); Ichirou Shiraki, Nara (JP); Hideo Kasugai, Nara (JP); Hironobu Tatsumi, Osaka (JP); Hirofumi Katsuse, Mie (JP); Osamu Sasaki, Nara (JP); Masayuki Inoue, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 214 days.

(21) Appl. No.: 10/937,402

(22) Filed: Sep. 10, 2004

(65) Prior Publication Data

US 2005/0116915 A1 Jun. 2, 2005

(30) Foreign Application Priority Data

Sep. 11, 2003 (JP) ............................. 2003-320462

(51) Int. Cl.
*G02F 1/1333* (2006.01)
*G02F 1/1343* (2006.01)

(52) U.S. Cl. .......................................... 349/54; 349/55
(58) Field of Classification Search ............. 349/54–55
See application file for complete search history.

(56) References Cited

U.S. PATENT DOCUMENTS

| | | | | |
|---|---|---|---|---|
| 4,609,809 A | * | 9/1986 | Yamaguchi et al. ... | 219/121.35 |
| 5,076,666 A | * | 12/1991 | Katayama et al. ............. | 349/55 |
| 5,204,764 A | * | 4/1993 | Maeda et al. .................. | 349/51 |
| 5,373,379 A | * | 12/1994 | Nakai ........................... | 349/55 |
| 5,414,547 A | * | 5/1995 | Matsuo et al. ................. | 349/44 |
| 5,748,268 A | * | 5/1998 | Kalmanash .................... | 349/47 |
| 5,899,548 A | * | 5/1999 | Ishiguro ........................ | 349/47 |
| 6,034,749 A | * | 3/2000 | Sato et al. ..................... | 349/47 |
| 6,100,950 A | * | 8/2000 | Tanaka ......................... | 349/47 |
| 6,515,720 B1 | | 2/2003 | Iizuka et al. | |
| 6,542,205 B2 | * | 4/2003 | Ohtani et al. ................. | 349/47 |
| 6,778,233 B2 | | 8/2004 | Matsuura et al. | |
| 6,791,634 B2 | * | 9/2004 | Ichioka et al. ................ | 349/55 |
| 6,937,296 B2 | * | 8/2005 | Mizumura et al. ............ | 349/54 |
| 7,106,391 B2 | * | 9/2006 | Song ............................. | 349/44 |
| 2006/0009016 A1 | * | 1/2006 | Yamazaki et al. .......... | 438/487 |

FOREIGN PATENT DOCUMENTS

| | | |
|---|---|---|
| JP | 5-5895 A | 1/1993 |
| JP | 2000-81639 A | 3/2000 |
| JP | 2000-187248 A | 7/2000 |
| JP | 2000-292808 A | 10/2000 |
| KR | 2002-41749 A | 6/2002 |

\* cited by examiner

*Primary Examiner*—James A. Dudek
(74) *Attorney, Agent, or Firm*—Birch, Stewart, Kolasch & Birch, LLP

(57) ABSTRACT

In an active matrix substrate for allowing a point defect of a defect pixel portion, among a plurality of pixel portions arranged two-dimensionally, to be repaired by radiation of energy, the active matrix substrate includes one of a first protection member for absorbing excessive energy power and preventing pieces of a conductive material from being scattered; and a second protection member for preventing pieces of a conductive material from being scattered and for preventing a conductive layer from bulging. One of the first protection member and the second protection member is provided above at least one energy radiation portion.

28 Claims, 38 Drawing Sheets

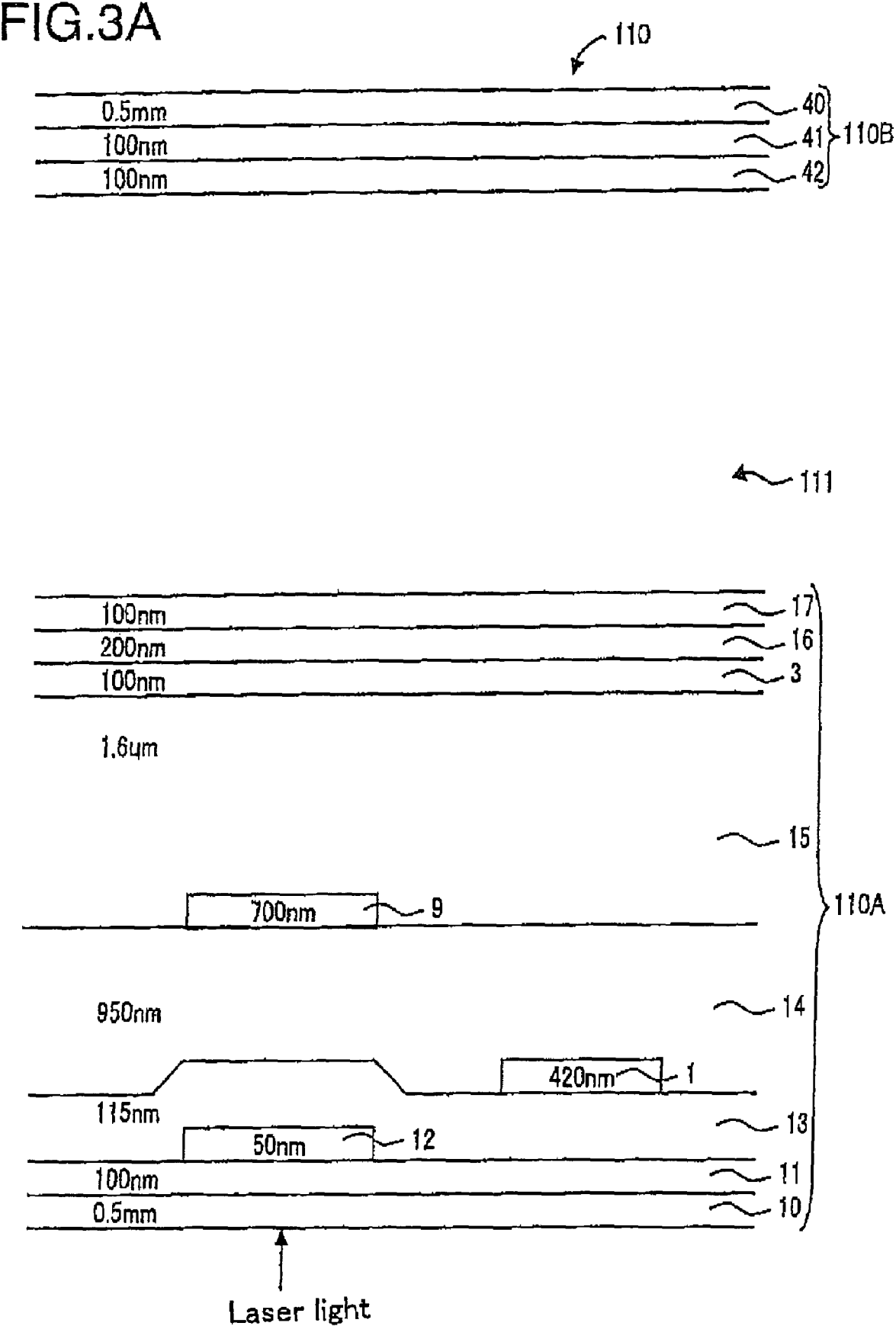

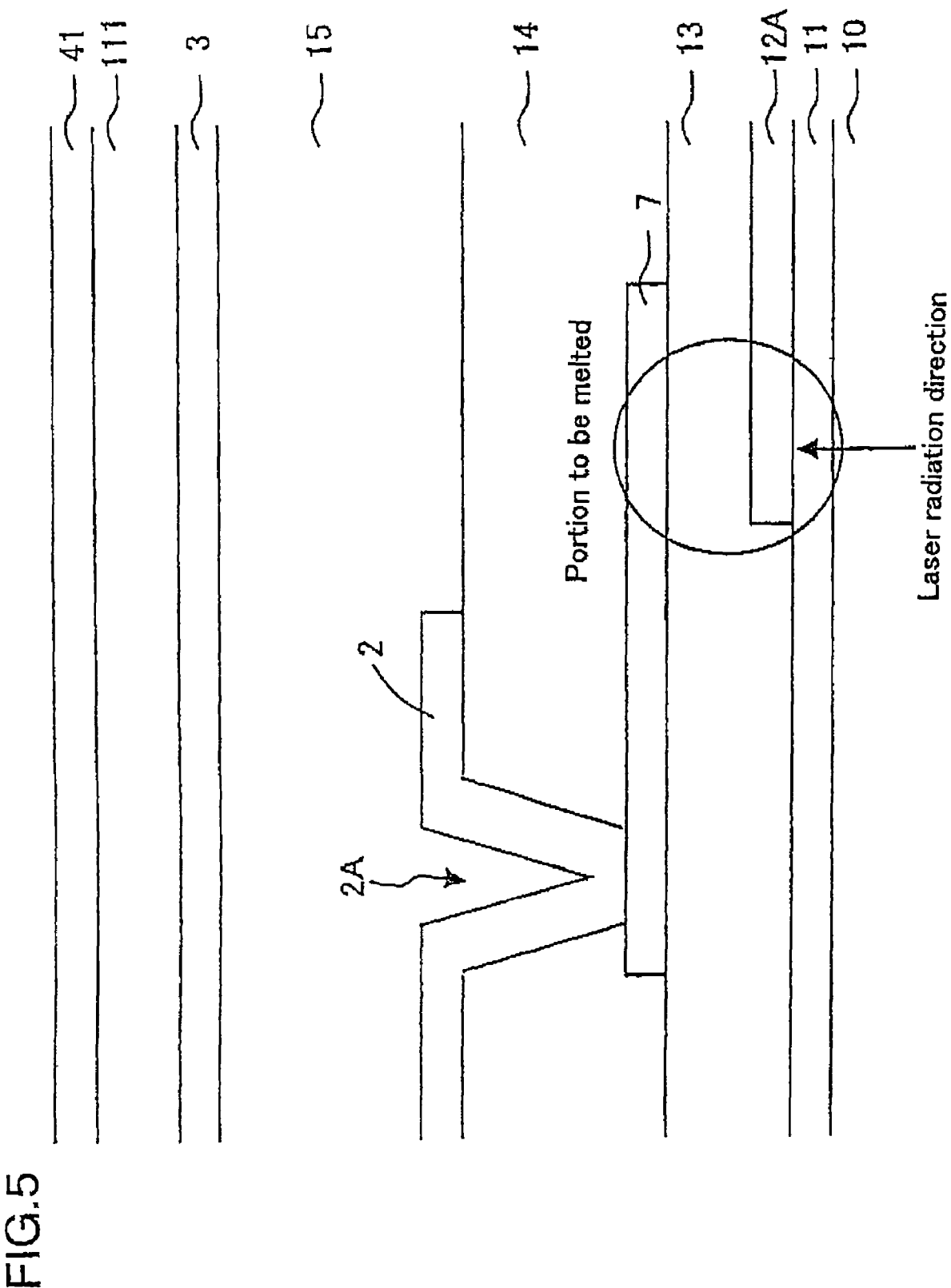

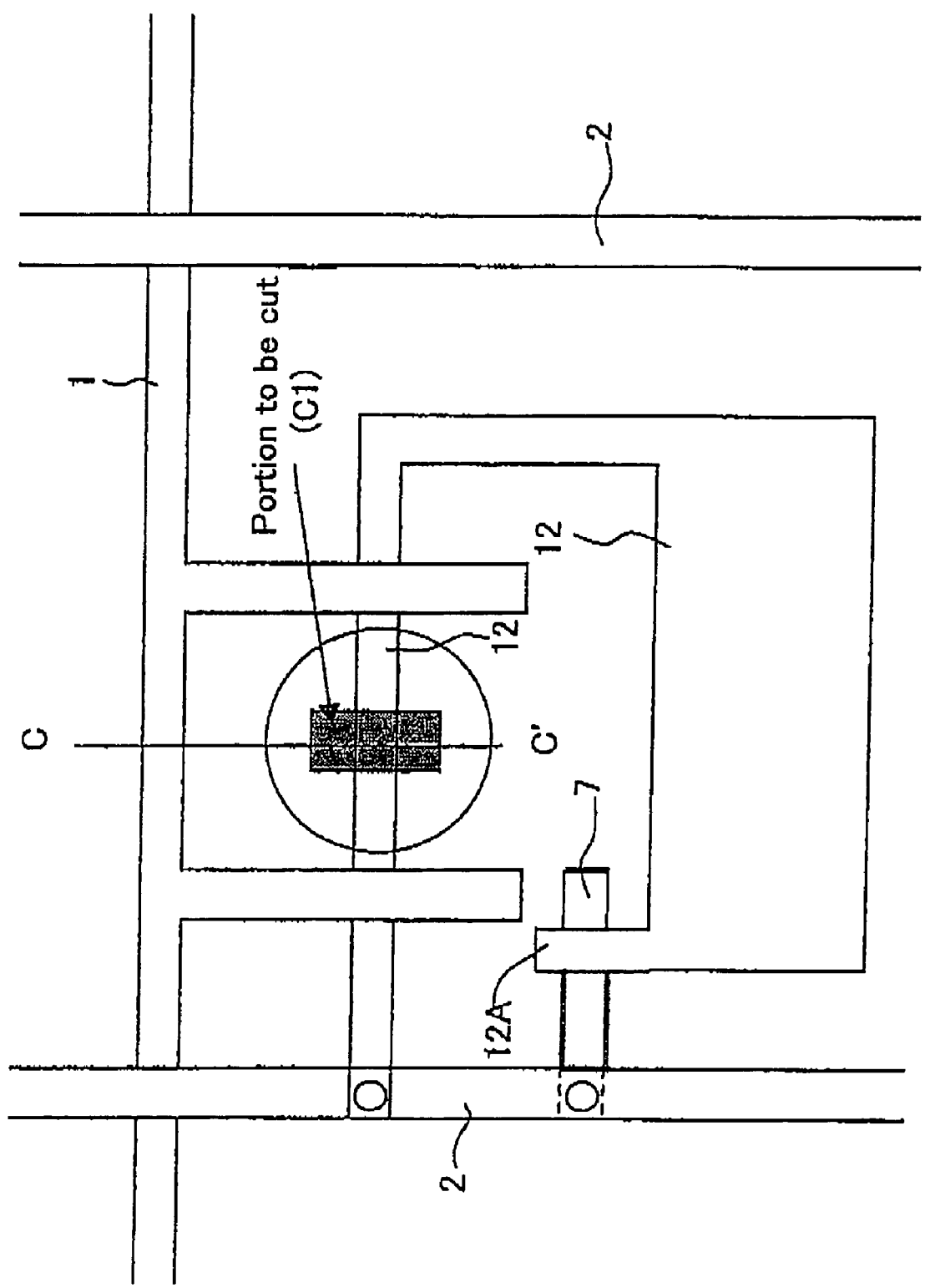

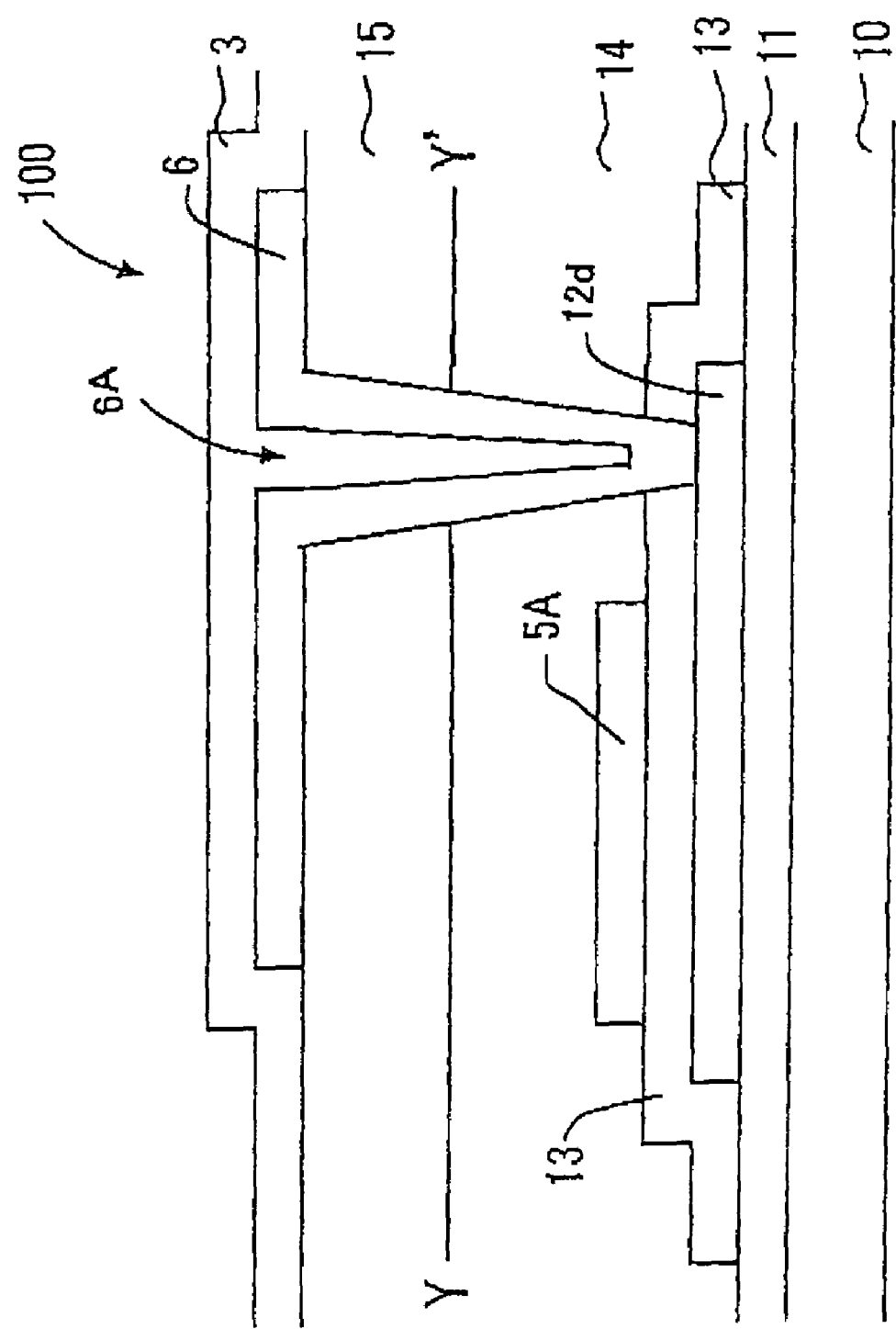

US 7,242,442 B2

ACTIVE MATRIX SUBSTRATE, DISPLAY APPARATUS, AND METHOD FOR PRODUCING THE SAME

This non-provisional application claims priority under 35 U.S.C., §119(a), on Patent Application No. 2003-320462 filed in Japan on Sep. 11, 2003, the entire contents of which are hereby incorporated by reference.

BACKGROUND OF THE INVENTION

1. Field of the Invention

The present invention relates to a display apparatus such as a liquid crystal display apparatus capable of displaying a desired image on a display screen by applying a driving signal to each of a plurality of pixel electrodes arranged two-dimensionally via a corresponding switching device; a method for producing the same; and an active matrix substrate included in the display apparatus.

2. Description of the Related Art

Conventionally, this type of display apparatuses include, for example, liquid crystal display apparatuses, EL (electroluminescence) display apparatuses, and plasma display apparatuses. Such display apparatuses are capable of displaying a desired display pattern. (image) at high density on a display screen by, for example, selectively driving a plurality of pixel electrodes arranged in a matrix.

As a system for selectively driving the pixel electrodes, an active matrix system is known. According to the active matrix system, a plurality of pixel electrodes are arranged in a matrix (in rows and columns), and switching devices are respectively connected to the pixel electrodes. The pixel electrodes are selectively driven via a corresponding switching device. Generally known switching devices for selectively driving the pixel electrodes include, for example, TFTs (thin film transistors), MIM (metal-insulator-metal) devices, MOS (metal-oxide-semiconductor) transistors, and diodes. The above-mentioned type of display devices include a liquid crystal layer, an EL light emitting layer, a plasma light emitting element or various other types of display mediums interposed between the pixel electrodes and a counter electrode facing the pixel electrodes. The active matrix driving system is capable of realizing high contrast display and thus is practically used for liquid crystal TVs, computer terminal displays, and the like.

FIG. 32A is a plan view illustrating a single display unit of an active matrix substrate 100 of a conventional active matrix liquid crystal display apparatus. FIG. 32B is a cross-sectional view of a part of FIG. 32A taken along line X–X'. FIG. 32C is a cross-sectional view of a part of FIG. 32A taken along line Y–Y'.

In addition to the active matrix substrate 100 shown in FIGS. 32A through 32C, the conventional active matrix liquid crystal display apparatus includes a counter substrate facing the active matrix substrate 100 and a liquid crystal layer acting as a display medium. The active matrix substrate 100 includes a glass plate 10 is (FIGS. 32B and 32C), a plurality of gate bus lines 1 (scanning lines), and a plurality of source bus lines 2 (signal lines). The plurality of gate bus lines 1 and the plurality of source bus lines 2 are provided on the glass plate 10. The plurality of gate bus lines 1 are provided parallel to each other in a row direction at a prescribed distance from each other. The plurality of source bus lines 2 are provided parallel to each other in a column direction at a prescribed distance from each other. Thus, the plurality of gate bus lines 1 and the plurality of source bus lines 2 are arranged in a lattice. The source bus lines 2 may be perpendicular to, or may simply cross, the gate bus lines 1. A pixel electrode 3 (represented by the dashed line in FIG. 32A) is provided in each of the areas surrounded by the gate bus lines 1 and the source bus lines 2. Alternatively, the pixel electrode 3 may be provided at each of intersections of the gate bus lines 1 and the source bus lines 2. Thus, a plurality of pixel electrodes 3 (only one is shown in FIG. 32A) are provided in a matrix. Each pixel electrode 3 is formed of a transparent electrode.

As shown in FIG. 32A, two TFTs 4 each acting as a switching device are provided at portions branching from each gate bus line 1. As shown in FIG. 32B, the TFT 4 is provided on the glass plate 10 with a base coat layer 11 interposed therebetween. The TFT 4 includes a semiconductor layer 12 formed of silicon (Si). The semiconductor layer 12 includes a channel region 12a, source and drain regions 12c (e.g., formed of $n^+$-Si), and LDD regions (e.g., formed of $n^-$-Si) 12b. The source and drain regions 12c have impurities implanted thereto at a high concentration. The LDD regions 12b are interposed between the channel region 12a and the source and drain regions 12c, and have impurities implanted thereto at a low concentration. On the channel region 12a, a gate region 1a is provided with a gate insulating layer 13 interposed therebetween. The gate region 1a branches from the gate bus line 1. The gate region 1a is covered with the pixel electrode 3 with an interlayer insulating layer 14 and a resin layer 15 interposed therebetween. Although not shown, an alignment layer (PI) is provided on the pixel electrode 3, and the liquid crystal layer is provided in contact with the alignment layer.

Referring to FIG. 32A again, a storage capacitance bus line (storage capacitance line) 5 is provided along, and parallel to, each gate bus line 1. The storage capacitance bus line 5 is patterned in the same step as the gate line 1 and formed of a metal layer (gate metal). The storage capacitance bus line 5 includes a wide portion 5A. As shown in FIG. 32C, an extended semiconductor portion 12d which extends from the drain region 12c of the TFT 4 and is provided below the wide portion 5A with the gate insulating layer 13 interposed therebetween. The extended semiconductor portion 12d is connected to the pixel electrode 3 via a metal layer 6 (source metal layer) and a contact hole 6A. The source metal layer 6 is patterned in the same step as the source bus line 2. The contact hole 6A is formed in the interlayer insulating layer 14 and the resin layer 15. Thus, the extended semiconductor portion 12 acts as one storage electrode, and faces the wide portion 5A acting as the other storage electrode with the gate insulating layer 13 interposed therebetween. Thus, a storage capacitance is formed between the extended semiconductor portion 12d and the wide portion 5A.

The conventional active matrix liquid crystal display apparatus having the above-described structure has the following problems. In the case where, for example, a TFT 4 acting as a switching device is defective, the pixel electrode connected to the defective TFT 4 is not supplied with a signal voltage, which should normally be provided. The user recognizes this as a point-like pixel defect (hereinafter, referred to as the "point defect") on the display screen such a point defect significantly spoils the display quality of the liquid crystal display apparatus, and is a serious problem in terms of production yield.

The main causes of such a point defect are roughly classified into the following two typen.

One type of defect is an ON defect. An ON defect occurs when a pixel electrode 3 cannot be sufficiently charged with an image signal from the source bus line 2 during the time period in which the corresponding TFT 4 is selected by the scanning signal from the gate bus line 1. This is caused by, for example, a defect of the TFT 4. The other is an OFF defect. An OFF defect is caused when the charge provided to the pixel electrode 3 leaks during the time period in which the corresponding TFT 4 is not selected. This is also caused by, for example, a defect of the TFT 4.

The ON defect is caused by the defect of the TFT 4 as a switching device. The OFF defect occurs in two cases: (i) when an electric leak occurs through the TFT 4 as a switching device; and (ii) when an electric leak occurs between the pixel electrode 3 and the gate bus line 1/source bus line 2. In both the ON defect and the OFF defeat, the voltage applied between the pixel electrode 3 and the counter electrode (not shown) does not reach the level necessary for display. As a result, in the normally white mode (in which the light transmittance is maximum when the voltage applied to the liquid crystal layer is 0 V), the defective pixel is recognized as a luminous point; and in the normally black mode (in which the light transmittance is minimum when the voltage applied to the liquid crystal layer is 0 V), the defective pixel is recognized as a black point.

Such a point defect can be detected by an inspector with the naked eye as follows. When the active matrix substrate 100 including the TFTs 4 as switching devices and a counter substrate including the counter electrode are put together and a liquid crystal material is injected into the space between the two substrates, a prescribed electric signal (inspection signal) is applied to the gate bus line 1 and the source bus line 2. Then, a repair work is performed as follows. For example, the source bus line 2 and the pixel electrode 3 are melted to be shortcircuited, or the drain region (a part of the semiconductor layer) acting as the drain electrode of the TFT 4 is cut off from the TFT 4 to electrically separate the TFT 4 from the pixel electrode 3. Thus, the pixel electrode 3 is charged and discharged by a signal voltage from the source bus line 2 regardless of whether the corresponding gate bus line 1 is selected or non-selected. In this manner, the liquid crystal display apparatus fulfills the inspection criteria and can be shipped as being substantially equivalent to normal apparatuses.

Such a repair work of the defective pixel is performed by laser radiation (laser repair). For improving the possibility of success of the repair work, Japanese Laid-Open Publication No. 2000-81639, for example, proposes the following liquid crystal display apparatus. A portion which is to be cut by laser radiation is constricted, and the pixel electrode and the interlayer insulating layer are partially removed so as not to cover the constricted portion (laser radiation portion), as described in more detail below with reference to FIG. 33.

FIG. 33 is a plan view illustrating a schematic structure of one display unit of an active matrix substrate of the liquid crystal display apparatus disclosed in Japanese Laid-Open Publication No. 2000-81639.

As shown in FIG. 33, the active matrix substrate has three constricted portions: one is a constricted portion a in the drain region of the TFT 4; another is a constricted portion b in the extended semiconductor portion 12d, which faces the gate bus line 1 to form a storage capacitance, and still another is a constricted portion c in the vicinity of the gate region branched from the gate bus line 1. The pixel electrode 3 (hatched) is not provided on the constricted portions a through c. In another structure, the interlayer insulating layer is not provided on the constricted portions a through c. A portion 31 which is open at the center of the pixel electrode 3 is a contact portion through which the pixel electrode 3 and the extended semiconductor portion 12d are connected to each other.

In the case where, for example, the gate region 1a and the drain region of the TFT 4 are shortcircuited, the constricted portion a is out in the normally black mode and the constricted portion c is out in the normally white mode. Thus, the source region and the drain region are shortcircuited via the gate region 1a.

In the case where the pixel electrode 3 and another pixel electrode adjacent thereto are shortcircuited at point D1, the constricted portion a is cut in the normally black mode and the constricted portion a of the adjacent pixel electrode is cut in the normally white mode.

In the case where the extended semiconductor portion 12d and the gate bus line 1 corresponding to the adjacent pixel electrode are shortcircuited at point D2, the constricted portion b is out in the normally black mode. In the normally white mode, the constricted portion c is cut so as to shortcircuit the source region and the drain region of the TFT 4 via the gate region 1a, and the constricted portion b is cut.

By providing the constricted portions a through c, the width of the portions to be out is made thinner than the usual width. Thus, the portions are more easily cut, such that the repair can be performed easily. As described above, the pixel electrode 3 is not provided on the laser radiation portions. Therefore, the pixel electrode 3 is not deformed even when the portions to be repaired are out by laser radiation. This substantially avoids such a secondary defect that the pixel electrode 3 contacts the counter electrode (not shown) facing the pixel electrode 3 or the out surface of the portions to be repaired. Since pieces of the interlayer insulating layer generated by cutting do not adhere to the conductive pixel electrode 3, the counter electrode and the other electrodes do not easily form conductive contacts with each other, which avoids further defects. The structure in which the pixel electrode 3 is not provided on the laser radiation portions provides further advantage that the laser power is not absorbed by the pixel electrode 3 and thus the level of the laser power required for cutting is lowered. This decreases the risk of a defective display due to the disturbance of the alignment layers and the disturbance of the alignment of the liquid crystal molecules. In the case where neither the pixel electrode 3 nor the interlayer insulating layer are provided on the laser radiation portions, metal pieces resulting from the cutting do not adhere to the pieces of the interlayer insulating layer. This avoids the risk of re-leak of charges at the cut portions. The structure in which the interlayer insulating layer is not provided on the laser radiation portions provides the further advantage that the laser power is not absorbed by the interlayer insulating layer and thus the level of laser power required for cutting is lowered.

In order to efficiently perform laser repair of the above-mentioned point defect, it is necessary to accurately evaluate and adjust the laser radiation position, laser light intensity, laser size (size of the laser spot R), the number of times of irradiation with laser radiation, and the like. Even with such evaluation and adjustment, there still may occur leaks and other defeats due to pieces of conductive material being scattered around by excessive laser power or due to bulging of the conductive layer. Therefore, it is very difficult to realize a 100% success rate of laser repair. In order to perform the repair work more precisely and efficiently, it is important to avoid leaks or other defects.

Japanese Laid-Open Publication No. 2000-81639 constricts the portions to be cut such that these portions can be more easily cut, and partially remove the pixel electrode 3 and the interlayer insulating layer so as to eliminate the causes of the leaks. The constricted portions advantageously allow the cutting to be done at a lower laser power. However, this method requires additional steps of partially removing the transparent pixel electrode 3 and the interlayer insulating layer so as not to cover the laser radiation portions. This undesirably complicates the production method.

SUMMARY OF THE INVENTION

According to one aspect of the invention, an active matrix substrate for allowing a point defeat of a defect pixel portion, among a plurality of pixel portions arranged two-dimensionally, to be repaired by radiation of energy is provided. The active matrix substrate includes one of a first protection member for absorbing excessive energy power and preventing pieces of a conductive material from being scattered; and a second protection member for preventing pieces of a conductive material from being scattered and for preventing a conductive layer from bulging. One of the first protection member and the second protection member is provided above at least one energy radiation portion.

In one embodiment of the invention, the at least one energy radiation portion includes a plurality of energy radiation portions.

In one embodiment of the invention, each of the plurality of pixel portions includes a switching device and a pixel electrode. The switching device includes a first driving region connected to a signal line and a second driving region connected to the pixel electrode.

In one embodiment of the invention, the active matrix substrate further includes a plurality of scanning lines arranged parallel to one another and a plurality of signal lines arranged so as to be parallel to one another and so as to cross the plurality of scanning lines. The plurality of pixel electrodes are provided in a matrix respectively at intersections of the plurality of scanning lines and the plurality of signal lines. Each of the scanning lines is connected to a control region of the corresponding switching device.

In one embodiment of the invention, the energy radiation portion is a portion to be melted. In the energy radiation portion, a first layer and a second layer partially overlap each other with an insulating layer interposed therebetween, the first layer being formed of a semiconductor layer including the second driving region of the switching device or a conductive layer connected to the semiconductor layer, and a second layer being formed of a conductive or semiconductor layer connected to the signal line.

In one embodiment of the invention, the first layer is a first projected portion projecting from the second driving region of the switching device. The second layer is a second projected portion connected to the signal line via a contact hole and projected from the signal line to partially overlap the first projected portion.

In one embodiment of the invention, the first projected portion and the second projected portion project from the overlapping portion by a prescribed distance.

In one embodiment of the invention, the energy radiation portion is a portion to be cut, and is a part of the semiconductor layer extending from the switching device to the pixel electrode.

In one embodiment of the invention, the first protection member is a protection layer for absorbing the excessive energy power and preventing the pieces of the conductive material from being scattered.

In one embodiment of the invention, a second protection member is a protection layer for preventing the pieces of the conductive material from being scattered and for preventing the conductive layer from bulging.

In one embodiment of the invention, at least one of the first protection member and the second protection member is provided above the energy radiation portion and below the pixel electrode which is provided in each of the plurality of pixel portions.

In one embodiment of the invention, a surface of at least one of the first protection member and the second protection member which is irradiated with energy is concave so as to be opened toward the energy radiation portion.

In one embodiment of the invention, the second protection member is a spacer member for preventing the pieces of the conductive material from being scattered and for preventing the conductive layer from bulging.

In one embodiment of the invention, the second protection member includes a protection layer for preventing the pieces of the conductive material from being scattered and for preventing the conductive layer from bulging and a spacer member for preventing the pieces of the conductive material from being scattered and for preventing the conductive layer from bulging. The spacer member projects from a top surface of the active matrix substrate by a prescribed distance.

In one embodiment of the invention, the switching device is one of a thin film transistor, an MIM device, a MOS transistor, and a diode.

In one embodiment of the invention, the thin film transistor is a polycrystalline thin film transistor using polycrystalline silicon as the semiconductor layer.

In one embodiment of the invention, the thin film transistor has a top gate structure having a control region above a channel region with an insulating layer interposed therebetween.

In one embodiment of the invention, the thin film transistor has a top gate structure having a control region below a channel region with an insulating layer interposed therebetween.

In one embodiment of the invention, at least one of the first protection member and the second protection member is formed of the same metal layer as that of a scanning line or a signal line.

In one embodiment of the invention, at least one of the first protection member and the second protection member is formed of a colored resin layer.

In one embodiment of the invention, at least one of the first protection member and the second protection member has a planar shape of one of a square shape, a rectangular shape, a circular shape, an elliptical shape, a polygonal shape, and a cross-shape.

In one embodiment of the invention, at least one of the first protection member and the second protection member has a planar size which is equal to, or larger than the planar size of an energy radiation portion.

According to another aspect of the invention, a display apparatus includes the above-mentioned active matrix substrate; and a counter substrate facing the active matrix substrate with a display medium interposed between the active matrix substrate and the counter substrate, the counter substrate having a counter electrode facing the plurality of pixel electrodes of the active matrix substrate. The display medium is driven by a display signal applied between the pixel electrode and the counter electrode to display an image.

In one embodiment of the invention, when at least one of a plurality of pixel portions, each having a pixel electrode, is a defect pixel portion, an energy radiation portion of the defect pixel portion is irradiated with energy to perform at least one of a melting operation and a cutting operation.

In one embodiment of the invention, the display medium is one of a liquid crystal material, an EL light emitting layer, and a plasma light emitting element.

In one embodiment of the invention, a spacer member for preventing the pieces of the conductive material from being scattered and for preventing the conductive layer from bulging is provided as a second protection member on one of the active matrix substrate and the counter substrate.

In one embodiment of the invention, the display apparatus is one of a transmission type, a reflection type, and a semi-transmission type having a transmission mode and a reflection mode.

According to still another aspect of the invention, a method for producing the above-mentioned display apparatus includes the steps of applying a prescribed signal, from the scanning line and the signal line of the display apparatus, between the pixel electrode and the counter electrode of the display apparatus, thereby detecting a point defeat of the pixel portion; and irradiating an energy radiation portion of the defect pixel portion, in which the point defect is detected, with energy from outside of the display apparatus, thereby performing at least one of a melting operation and a cutting operation.

In one embodiment of the invention, the step of irradiating includes the step of irradiating a corner of an area which includes an overlapping portion of a first projected portion and a second projected portion and also includes portions projecting from the overlapping portion.

In one embodiment of the invention, laser light is used as the energy.

In one embodiment of the invention, at least one of the first protection member and the second protection member is used as a guide for determining the position of the laser irradiation portion.

In one embodiment of the invention, the planar size of a protection layer as at least one of the first protection member and the second protection member is used as a guide for confirming the size of the laser irradiation portion.

In one embodiment of the invention, when the melting operation and the cutting operation are both performed, the cutting operation is performed before the melting operation.

According to the present invention, a first protection member is provided above the laser radiation portion in which laser repair is performed using laser light for absorbing the excessive laser power and for preventing a conductive material from being scattered.

Without the first protection member, the conductive materials (for example, the pixel electrode) which are not supposed to be irradiated with laser light are also provided with laser power, and thus bulge. This shortens the distance between the conductive materials and other conductive elements, which causes a leak. Owing to the first protection member, such a leak can be avoided.

Also without the first protection member, pieces of the conductive materials existing in the laser radiation portion (for example, the semiconductor layer to be shortcircuited) are scattered to other conductive elements (for example, the pixel electrode and the source metal layer). This shortens the distance between the conductive materials and the other conductive elements, which causes a leak. Owing to the first protection member, such a leak can be avoided.

According to the present invention, a spacer member (PS) is provided above the laser radiation portion in which laser repair is performed using laser light for preventing pieces of the conductive materials from being scattered and for preventing the conductive materials from bulging.

Without the spacer member (PS), pieces of the conductive materials existing in the laser radiation portion (for example, the semiconductor layer to be shortcircuited) are scattered to other conductive elements (for example, the pixel electrode and the source metal layer). This shortens the distance between the conductive materials and the other conductive elements, which causes a leak. Owing to the spacer member (PS), such a leak can be avoided.

Also without the spacer member (PS), the conductive materials (for example, the pixel electrode) which are not supposed to be irradiated with laser light are also provided with laser power, and thus bulge. This shortens the distance between the conductive materials and other conductive elements, which causes a leak. Owing to the spacer member (PS), such a leak can be avoided.

Thus, the invention described herein makes possible the advantages of providing an active matrix substrate for allowing pixel defects to be repaired more certainly, to improve the production yield without complicating the production method, a display apparatus including such an active matrix substrate; and a method for producing the display apparatus.

These and other advantages of the present invention will become apparent to those skilled in the art upon reading and understanding the following detailed description with reference to the accompanying figures.

BRIEF DESCRIPTION OF THE DRAWINGS

FIG. 3A is a partial cross-sectional view of FIG. 1A taken along line B–B'.

FIG. 5 is a partial cross-sectional view of an active matrix liquid crystal display apparatus in a reference example without a protection layer, illustrating the state before melting.

FIG. 16 is a plan view illustrating a portion to be cut in an active matrix liquid crystal display apparatus according to Example 2 of the present invention, with a spacer member.

FIG. 32C is a partial cross-sectional view of FIG. 32A taken along line Y–Y'.

DESCRIPTION OF THE PREFERRED EMBODIMENTS

Hereinafter, the present invention will be described by way of illustrative examples with reference to the accompanying drawings. More specifically, a display apparatus including an active matrix substrate according to the present invention will be described by way of Examples 1 through 5, in which the present invention is applied to an active matrix liquid crystal display apparatus including an active matrix substrate, with reference to the drawings.

EXAMPLE 1

Figure 1A:
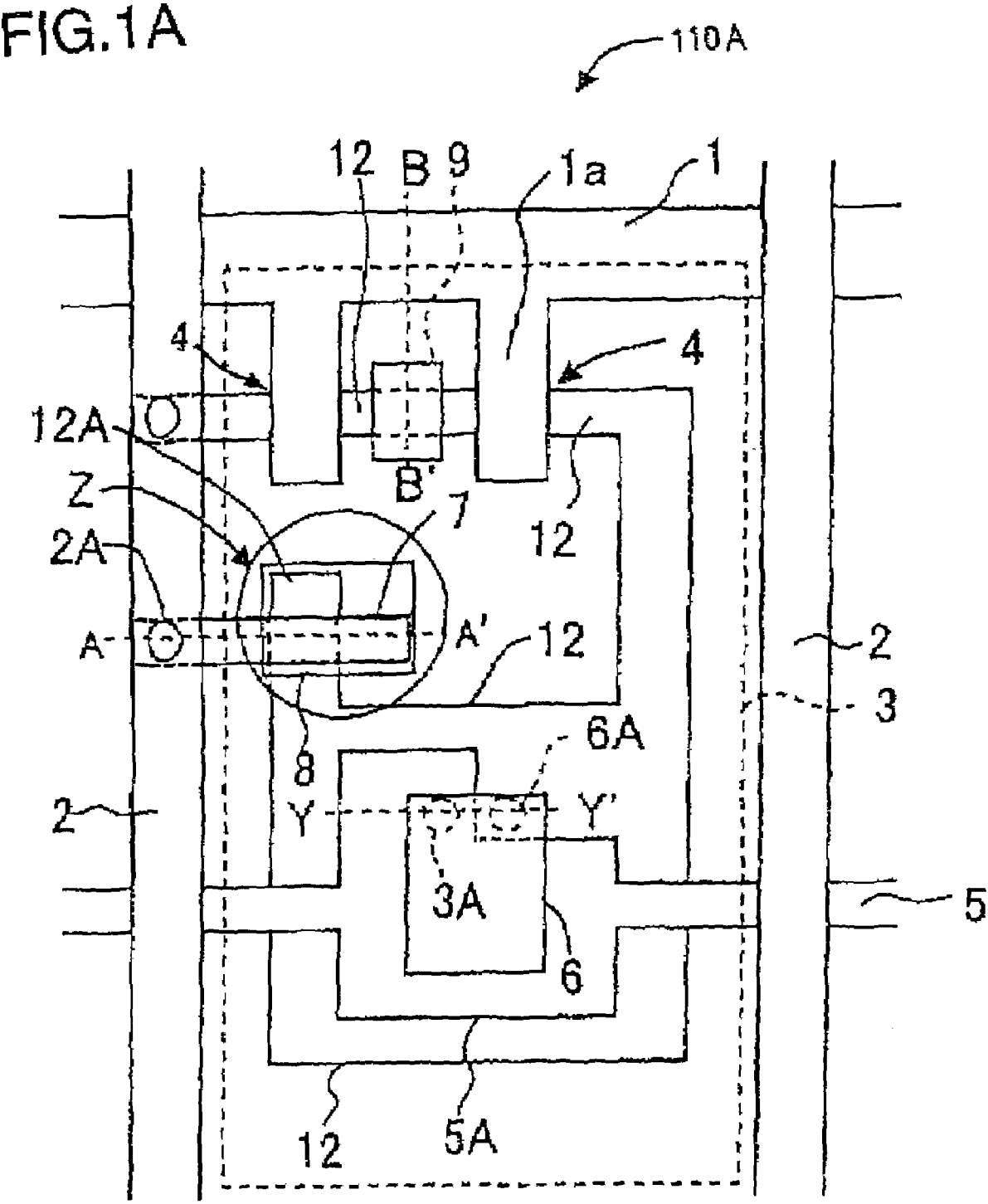
FIG. 1A is a plan view of an active matrix substrate of an active matrix liquid crystal display apparatus according to Example 1 of the present invention.
Figure 1B:
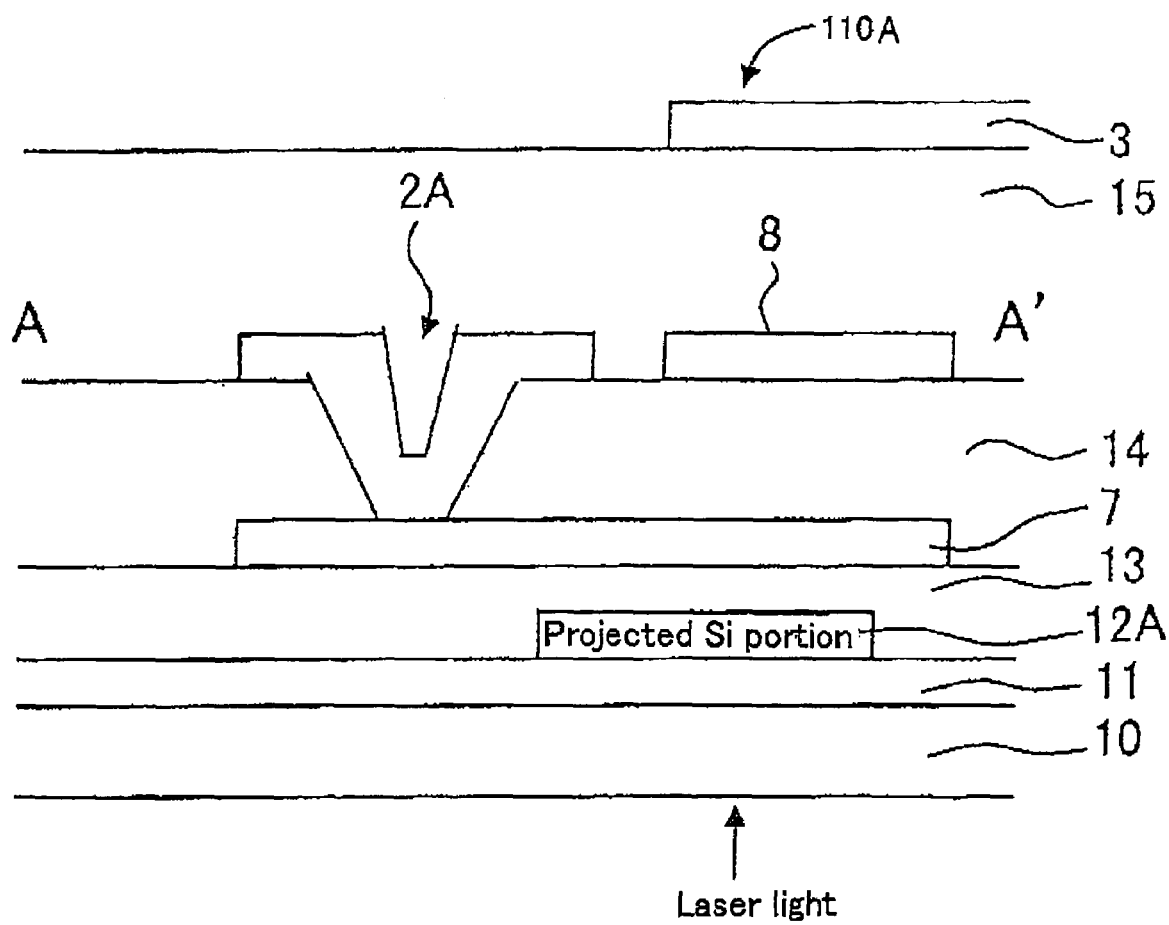
FIG. 1B is a partial cross-sectional view of FIG. 1A taken along line A–A'.

An active matrix liquid crystal display apparatus 110 (FIG. 3A) according to Example 1 of the present invention includes a pair of substrates facing each other with a liquid crystal layer interposed therebetween. FIG. 1A is a plan view of one of the substrates, i.e., an active matrix substrate 110A. More specifically, FIG. 1A shows a single display unit of the active matrix substrate 110A. FIG. 1B is a cross-sectional view of a part of FIG. 1A taken along line A–A'. Elements which are substantially the same as those in FIGS. 32A through 32C bear identical reference numerals therewith and will not be described in detail here. An overlapping portion of the gate region 1a and the semiconductor layer 12 acts as a control region.

The following description regarding the structure of an active matrix liquid crystal display apparatus according to the present invention will be concerned with a single display unit unless otherwise specified, throughout this specification.

Figure 32A:
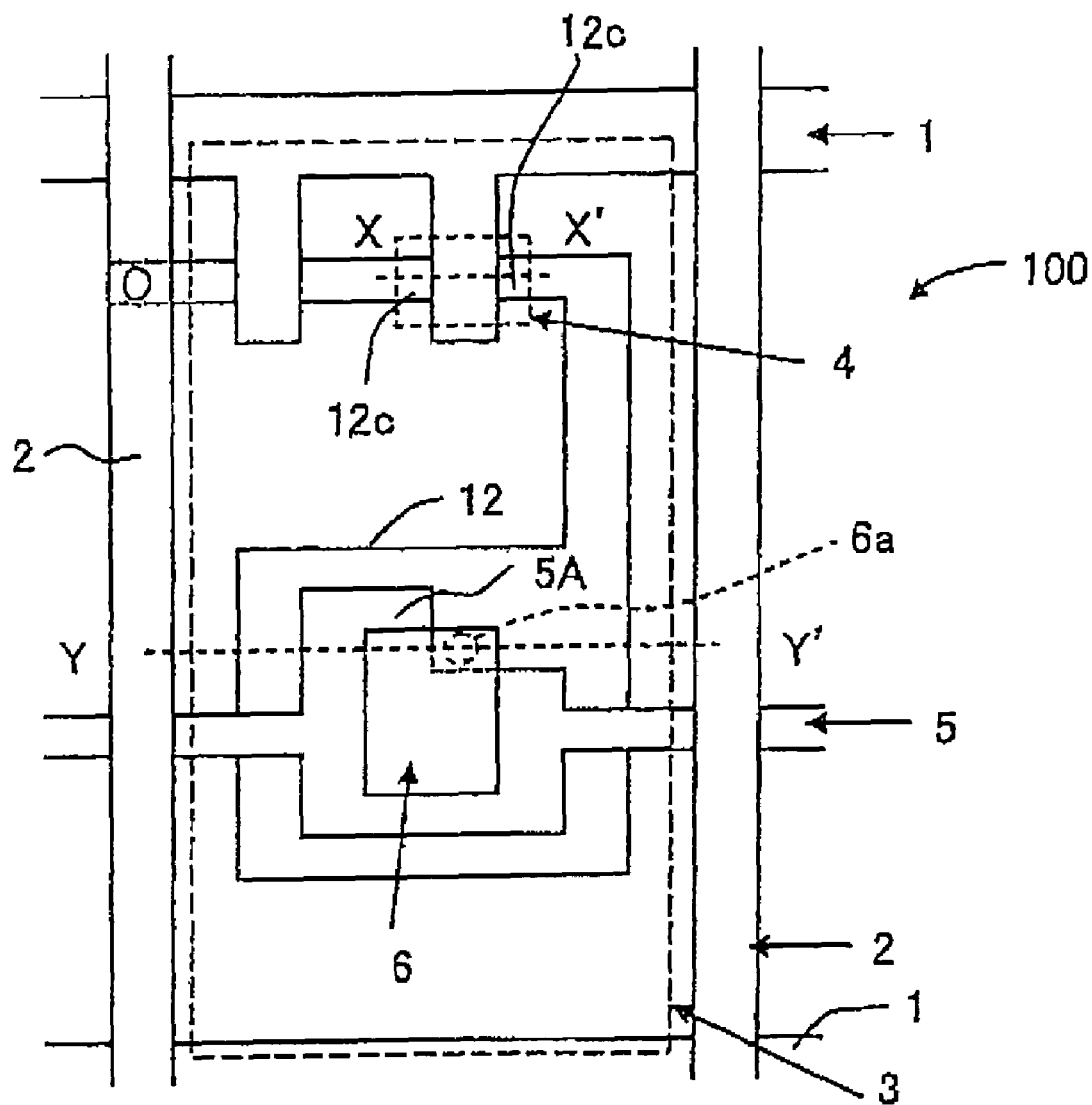
FIG. 32A is a plan view of an active matrix substrate of a conventional active matrix liquid crystal display apparatus.
Figure 32B:
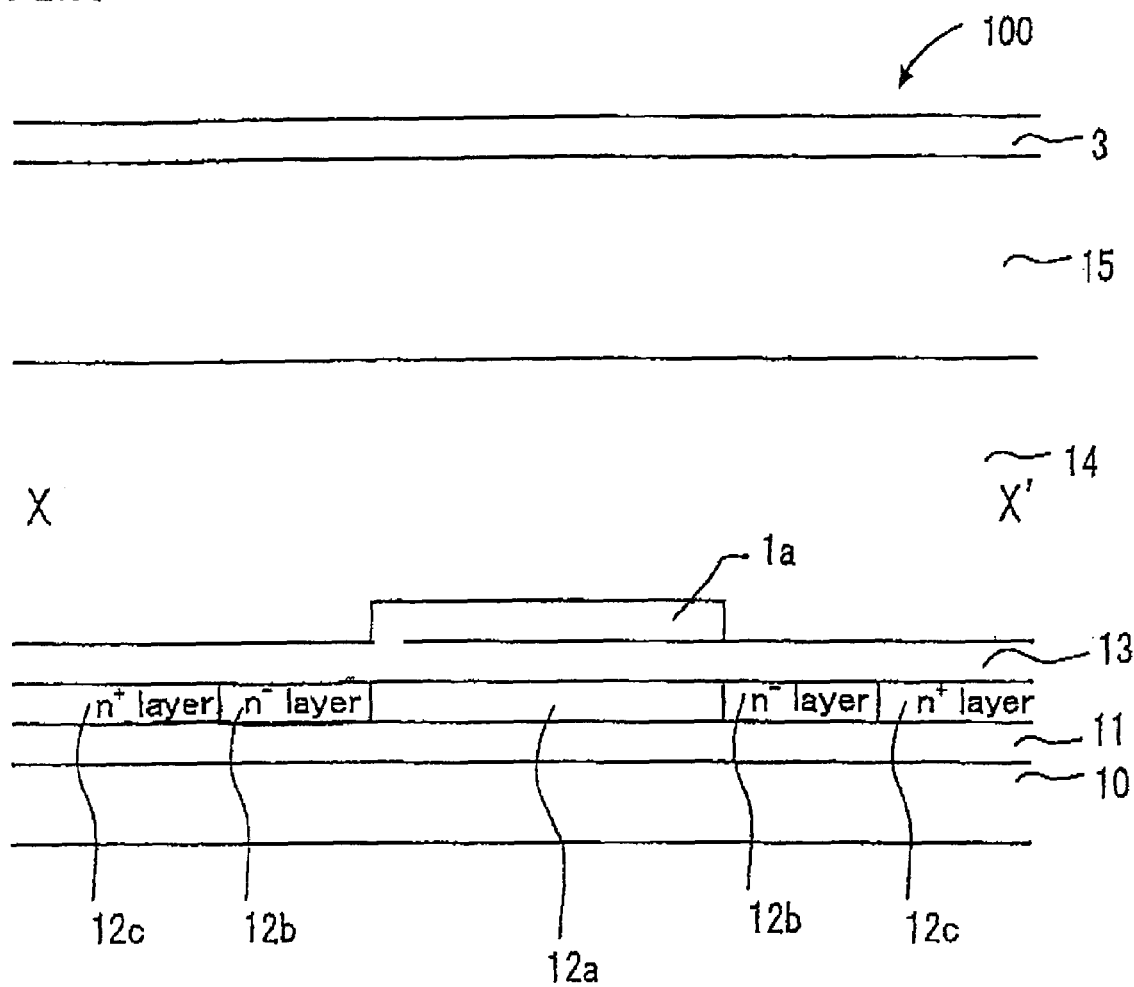
FIG. 32B is a partial cross-sectional view of FIG. 32A taken along line X–X'.
Figure 33:
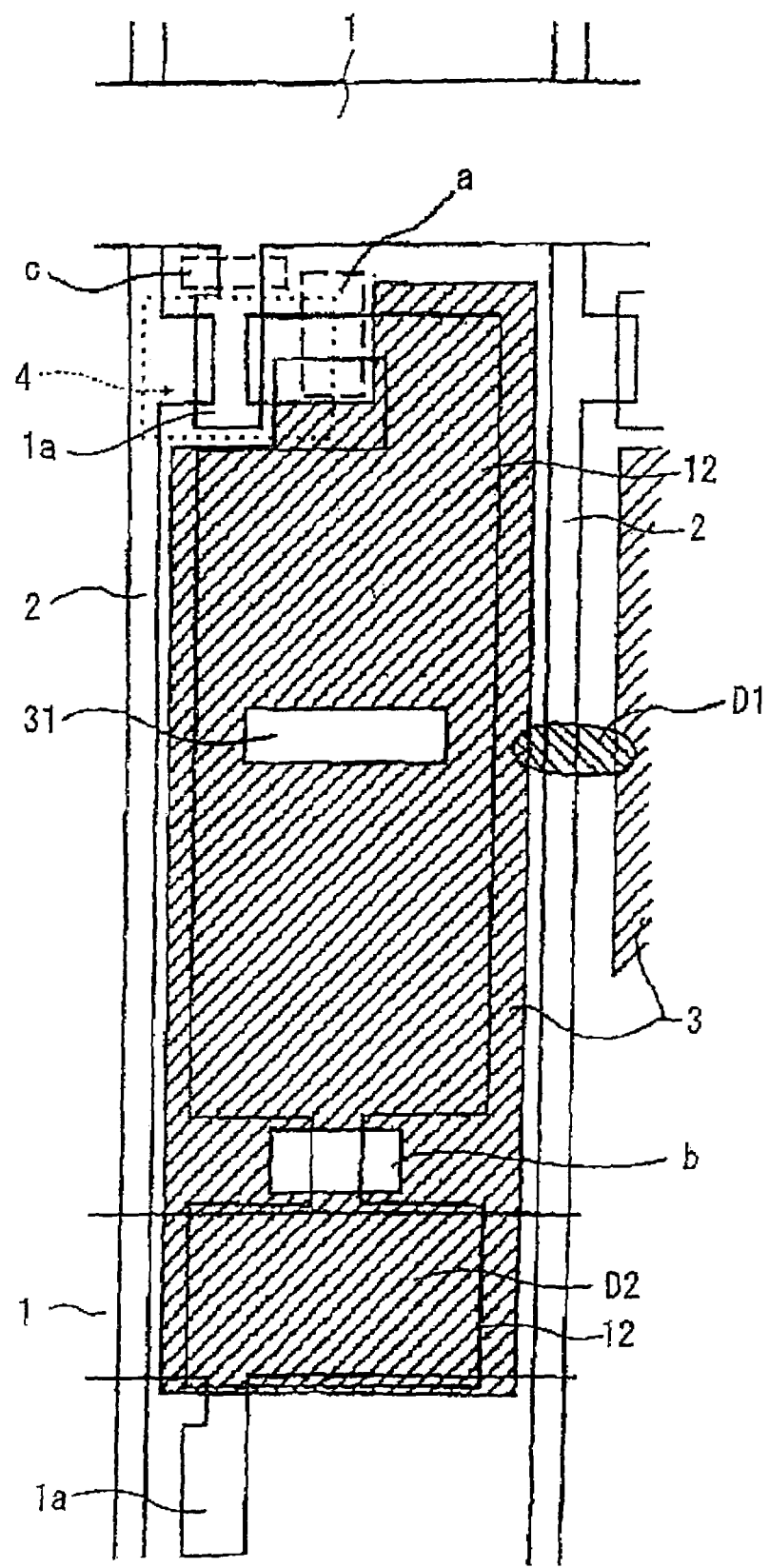
FIG. 33 is a plan view illustrating a schematic structure of an active matrix substrate of another conventional liquid crystal display apparatus.

As shown in FIGS. 1A and 1B, the active matrix substrate 110A includes a first projection portion 12A (first layer), in addition to the elements shown in FIGS. 32A through 32C. The first projection portion 12A is provided on the glass plate 10 with the base coat layer 11 interposed therebetween. In a planar view, the first projection portion 12A is positioned as follows. As shown in FIG. 1A, the source bus line 2 is connected to one of two driving regions of the TFT 4 (a first driving region; in this example, the source region 12c). The extended semiconductor portion 12d is extended from the other driving region of the TFT 4 (a second driving region; in this example, the drain region 12c) to below the wide portion 5A of the storage capacitance bus line 5. The first projection portion 12A is extended from the left end (FIG. 1A) of the wide portion 5A by a prescribed distance toward the gate bus line 1 parallel to the source bus line 2. The first projection portion 12A is formed of the same material as, and is produced in the same step as, the semiconductor layer 12. The first projection portion 12A will also be referred to as a "projected semiconductor portion 12A". The projected semiconductor portion 12A has a width of, for example, 10 μm.

The active matrix substrate 110A also includes a second projection portion 7, which is connected to the source bus line 2 via a contact hole 2A. The second projection portion 7 is provided below the source bus line 2 so as to be perpendicular to, or so as to simply cross, the gate bus line 1. The second projection portion 7 is located in substantially the middle between the gate bus line 1 and the storage capacitance bus line 5. The second projection portion 7 is formed of the same metal (conductive material) as, and is produced in the same stop as, the gate bus line 1. The second projection portion 7 will also be referred to as a "projected gate metal portion 7". The projected gate metal portion 7 has a width of, for example, 10 µm.

The projected semiconductor portion 12A and the projected gate metal portion 7 cross each other (FIG. 1A) and partially overlap each other with the gate insulating layer 13 interposed therebetween (FIG. 1B). On the interlayer insulating layer 14 are the projected semiconductor portion 12A and the projected gate metal portion 7, a protection layer 8 is provided so as to cover the projected semiconductor portion 12A and the projected gate metal portion 7. The protection layer 8 acts as a first protection member for absorbing excessive laser power and preventing the pieces of conductive material from scattering.

A portion to be cut by laser radiation is located between the gates of the two TFTs 4. A protection layer 9 (FIG. 1A) is provided on the semiconductor layer 12 in this portion. The protection layer 9 acts as a second protection member for preventing the pieces of the conductive material from scattering and preventing the conductive layer from bulging. The protection layers 8 and 9 are formed of the same metal layer as, and are produced in the same step as, the source bus line 2.

Figure 2A:
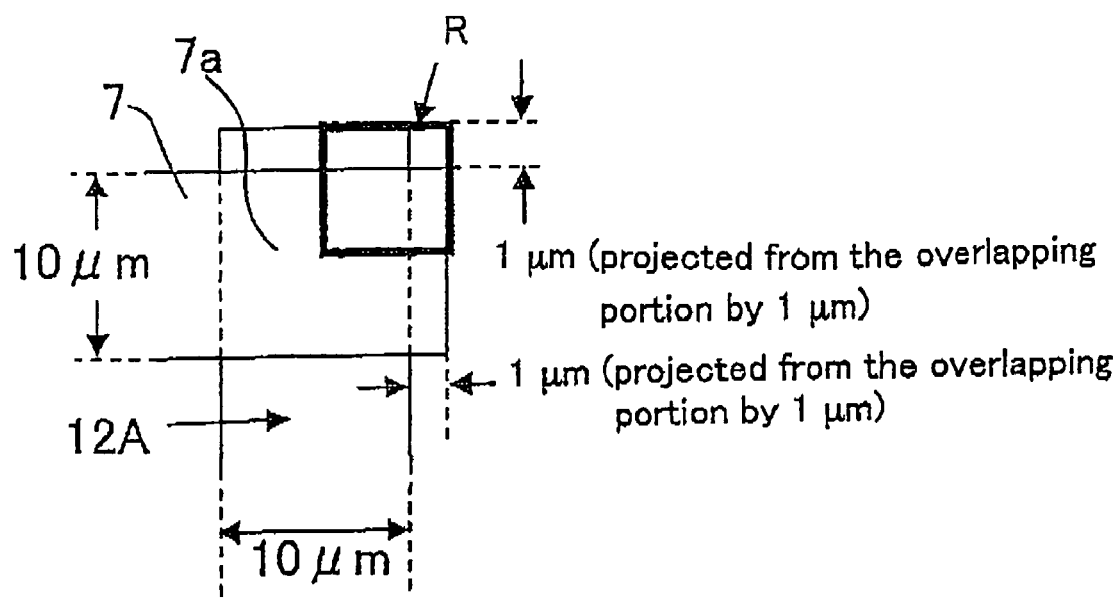
FIG. 2A is an enlarged view of circled portion Z of FIG. 1A, illustrating the case where a laser spot R for defect repair is on a corner thereof.
Figure 2B:
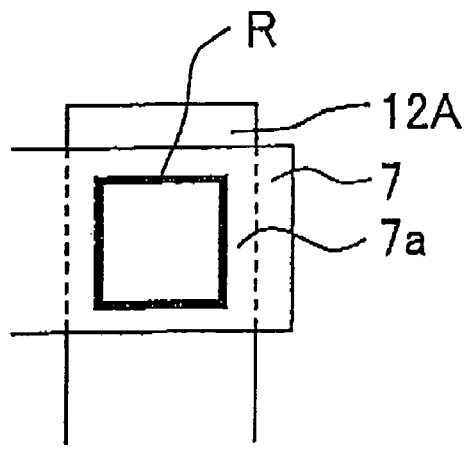
FIG. 2B is an enlarged view of circled portion Z of FIG. 1A, illustrating the case where the laser spot R for defect repair is on the center thereof.

FIGS. 2A and 2B are enlarged views of the circled portion Z of FIG. 1A, i.e., an overlapping portion 7a of the projected semiconductor portion 12A and the projected gate metal portion 7. FIG. 2A shows the case where a laser spot R for defect repair is on a corner of the overlapping portion 7a. FIG. 2B shows the case where the laser spot R for defect repair is on the center of the overlapping portion.

As shown in FIG. 2A, the projected semiconductor portion 12A and the projected gate-metal portion 7 are each projected from the overlapping portion 7a by about 1 µm. The positions to which the laser spot R is directed will be described in detail later with reference to FIGS. 2A and 2B.

Figure 3B:
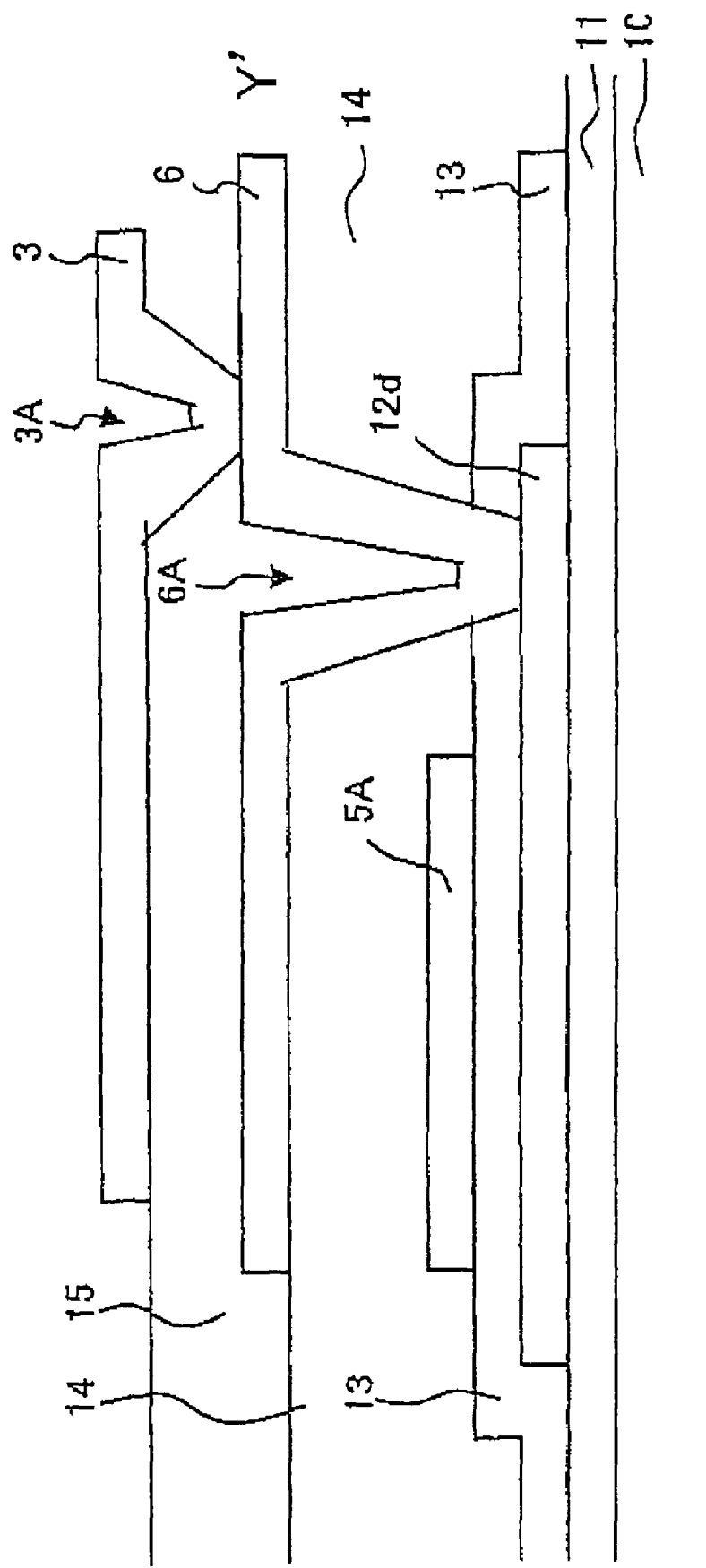
FIG. 3B is a partial cross-sectional view of FIG. 1A taken along line Y–Y'.

FIG. 3A is a cross-sectional view of FIG. 1A taken along line B–B'. FIG. 3B is a cross-sectional view of FIG. 1A taken along line Y–Y'. FIG. 3A also shows a counter substrate 110B of the active matrix liquid crystal display apparatus 110. The active matrix liquid crystal display apparatus 110 further includes a liquid crystal layer 111 interposed between the active matrix substrate 110A and the counter substrate 110B.

The active matrix substrate 110A includes the glass plate 10, the base coat layer 11, the semiconductor layer 12 which is patterned, the gate insulating layer 13, the gate line 1 which is patterned, the interlayer insulating layer 14, the source bus line 2 which is patterned, the protection layers 8 and 9, the resin layer 15, the transparent pixel electrode 3, a reflection layer 16 (in the case of a reflection type apparatus), and an alignment layer (PI) 17. These layers and elements are provided from the bottom in this order.

The counter substrate 110B includes a glass plate 40, a transparent counter electrode 41, and an alignment layer (PI) 42, which are provided in this order.

The active matrix substrate 110A and the counter substrate 110B are sealed together with a prescribed distance of space therebetween, and the liquid crystal layer 111 as a display medium is enclosed in the space. The prescribed distance is adjusted by a spacer (PS) acting as a spacer member (not shown).

Hereinafter, a method for producing the active matrix substrate 110A, and the active matrix liquid crystal display apparatus 110 including the active matrix substrate 110A will be described. In the following description, the thicknesses and other sizes are exemplary and approximate.

First, the glass plate 10 having a thickness of 0.5 mm is provided. On the glass plate 10, an SiON layer is provided by plasma CVD to a thickness of 100 nm to form the base coat layer 11.

Next, a silicon (Si) layer is formed by plasma CVD to a thickness of 50 nm and is crystallized by heat treatment and laser annealing. The resultant silicon layer is patterned as prescribed to form the semiconductor layer 12, which includes the drain region ($n^+$-Si) 12c (FIG. 32B), the extended semiconductor portion 12d, and the projected semiconductor portion 12A. As described above, the extended semiconductor portion 12d is extended from the drain region of the TFT 4 to below the wide portion 5A, and the projected semiconductor portion 12A is projected from the extended semiconductor portion 12d.

Then, an SiON layer is formed by plasma CVD to a thickness of 115 nm to form the gate insulating layer 13.

On the gate insulating layer 13, a tantalum nitride layer having a thickness of 50 nm and a tungsten layer having a thickness of 370 nm are sequentially provided in this order and patterned as prescribed. Thus, the gate bus line 1, the gate region 1a, the storage capacitance bus line 5, and the projected gate metal portion 7 are provided. The projected semiconductor portion 12A and the projected gate metal portion 7 in the overlapping portion 7a are insulated from each other by the gate insulating layer 13. Instead of tantalum nitride and tungsten, other metal materials such as Ta, W, Ti, Mo, Al, and Cu or metal alloys or compounds containing such metal materials as main components may be used.

An n-channel region 12a (FIG. 32B) and the pixel portion are doped with P (phosphorus) to form the LDD regions 12b ($n^-$ region) next to the channel region 12a and also to form the source and drain regions 12c ($n^+$ region) next to the LDD regions 12b. Then, heat treatment is performed to activate the impurity elements implanted into the semiconductor layer 12. A p-channel region is doped with B (boron).

An $SiN_x$ layer having a thickness of 250 nm and an $SiO_2$ layer having a thickness of 700 nm are provided by CVD to form the interlayer insulating layer 14. The interlayer insulating layer 14 is heat-treated to hydrogenate silicon. This process terminates the dangling bond of silicon using hydrogen contained in the interlayer insulating layer 14 including silicon nitride.

Then, the contact hole 2A is formed in the interlayer insulating layer 14 for connecting the projected gate metal portion 7 and the source bus line 2. The contact hole 6A is formed in the gate insulating layer 13 and the interlayer insulating layer 14 for connecting the extended semiconductor layer 12d and the source metal layer 6.

On the interlayer insulating layer 14, Ti, Al and Ti layers are sequentially provided by sputtering to respective thicknesses of 100 nm, 500 nm and 100 nm in this order and are patterned as prescribed. Thus, the source bus line 2, the source metal layer 6, and the protection layers 8 and 9 are formed. The source metal layer 6 and the extended semiconductor layer 12d are connected to each other via the contact hole 6A. The source bus line 2 and the extended gate metal portion 7 are connected to each other via the contact hole 2A.

Then, the resin layer 15 formed of an organic insulating material is formed to a thickness of 1.6 μm. A contact hole 3A is formed in the resin layer 15 for connecting the source metal layer 6 and the transparent pixel electrode 3 to each other.

On the resin layer 15, an ITO layer is provided by sputtering to a thickness of 100 nm and patterned as prescribed. Thus, the pixel electrode 3 is formed. The pixel electrode 3 is connected to the source metal layer 6 via the contact hole 3A.

In the case that the active matrix liquid crystal display apparatus 110 is of a reflection type, the reflection layer 16 is provided thereon to a thickness of 200 nm. In the case that the active matrix liquid crystal display apparatus 110 is of a transmission type, the reflection layer 16 is not provided. Thus, the active matrix substrate 110A is produced.

The alignment layer (PI) 17 is printed thereon and rubbed as prescribed.

The counter substrate 110B is produced as follows. On the glass plate 40 having a thickness of 0.5 mm, the transparent counter electrode 41 having a thickness of 100 nm is provided. The alignment layer (PI) 42 is printed thereon and rubbed as prescribed. Thus, the counter substrate 110B is produced.

On the alignment layer (PI) 17, spacers for setting the distance between the active matrix substrate 110A and the counter substrate 110B are scattered. Then, the active matrix substrate 110A and the counter substrate 110B are combined together with the alignment layer (PI) 17 and the alignment layer (PI) 42 inside. The liquid crystal layer 111 is enclosed in the space between the substrates 110A and 110B.

In this manner, the active matrix liquid crystal display apparatus 110 is produced.

Next, a method for repairing a pixel defect in the active matrix liquid crystal display apparatus 110 will be described.

When abnormality occurs in the TFT 4 or when an electric current leaks between the source bus line 2 and the pixel electrode 3, pixel defect occurs, which causes a display problem. In Example 1 of the present invention, the pixel defect is repaired as follows.

When a pixel portion has a point defect, it can be detected with the naked eye as follows. When the active matrix substrate 110A (also referred to as the TFT substrate) and the counter substrate 110B are combined together and the liquid crystal material is injected into the space between the substrates 110A and 110D, a prescribed electric signal (display signal for inspection) is applied to the pixel electrode 3 via the gate bus line 1 and the source bus line 2.

When a point defect is detected in the pixel portion, the overlapping portion 7a of the projected gate metal portion 7 and the projected semiconductor portion 12A is irradiated with laser radiation. Thus, the gate insulating layer 13 is destroyed, and the projected gate metal portion 7 and the projected semiconductor portion 12A are melted together and shortcircuited. Since the active matrix substrate 110A and the counter substrate 110B are already sealed together, the laser radiation is directed from the bottom surface of the glass plate 10. The laser radiation is performed using, for example, YAG laser light. A laser spot R (FIGS. 2A and 2B) has a side of several micrometers. For example, the laser spot R is a square of 5 μm×5 μm. The laser spot R may be rectangular.

As shown in FIG. 2A, the projected gate metal portion 7 and the projected semiconductor portion 12A are each projected from the overlapping portion 7a by about 1 μm. Such a structure improves the alignment precision during laser radiation, which facilitates the laser radiation and so facilitates the melting operation of the projected gate metal portion 7 and the projected semiconductor portion 12A.

It is advantageous, as shown in FIG. 2A, to direct the laser light to a corner of the area which includes the overlapping portion 7a and the projected portions of the projected gate metal portion 7 and the projected semiconductor portion 12A. In this way, the projected gate metal portion 7 and the projected semiconductor portion 12A can be melted more easily.

It is not advantageous, as shown in FIG. 2B, to direct the laser light to the center of the overlapping portion 7a. In this case, most of the laser power is absorbed by the projected semiconductor portion 12A, and it is more difficult to shortcircuit the projected gate metal portion 7 and the projected semiconductor portion 12A than in the case of FIG. 2A. In an experiment in which the laser light was directed to the center of the overlapping portion 7a (FIG. 2B) with the same conditions as those used when the laser light was directed to the corner (FIG. 2A), the projected gate metal portion 7 and the projected semiconductor portion 12A were not shortcircuited with certainty.

It is appreciated that when the laser light is directed to the corner (FIG. 2A), the projected gate metal portion 7 and the projected semiconductor portion 12A can be shortcircuited at less laser power than when the laser light is directed to the center (FIG. 2B). Even when the laser light is directed to the center, it is still possible to shortcircuit the projected gate metal portion 7 and the projected semiconductor portion 12A if a sufficiently high laser power is provided. However, when the laser power is too high, other portions which are not supposed to be provided with the laser power (i.e., the portions other than the portions 7 and 12A) are adversely affected. This will be described with reference to FIGS. 4A and 4B.

Figure 4A:
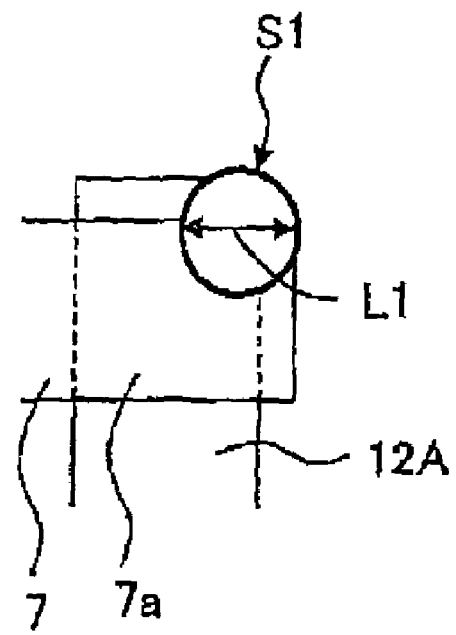
FIGS. 4A and 4B show areas which are influenced by laser radiation with different levels of laser power.
Figure 4B:
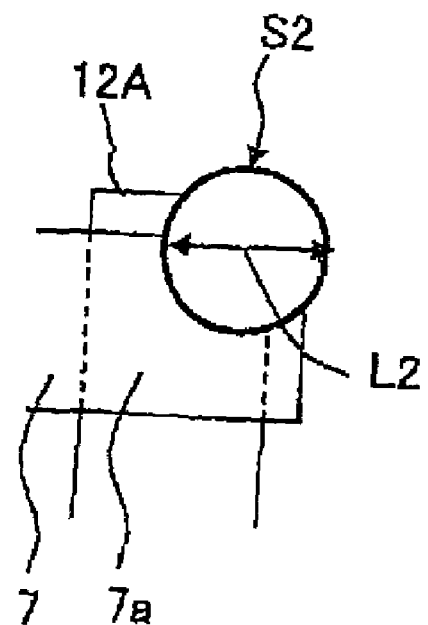

FIGS. 4A and 4B show areas which are influenced by the laser radiation. In both cases, the size of the laser spot R is the same. The laser power is higher in FIG. 4B than in FIG. 4A, and an influenced area S2 (diameter L2) influenced by the laser radiation in FIG. 4B is larger than an influenced area S1 (diameter L1) influenced by the laser radiation in FIG. 4A. In the influenced areas S1 and S2, pieces of silicon and gate metal are scattered. When elements other than the portions 7 and 12A are encompassed in the influenced area S1 or S2, a malfunction may occur. Therefore, it is preferable to direct laser light with a minimum possible power. In other words, it is preferable to direct the laser light to the corner as shown in FIG. 2A. It is not preferable to direct the laser light to other corners, for example, the corner along the projected portion of the portion 12A but closer to the source bus line 2. As being closer to the source bus line 2, the laser light has more influence on the source bus line 2.

When the projected semiconductor portion 12A and the projected gate metal portion 7 are shortcircuited, the pixel electrode 3 receives a source signal (display signal) from the source bus line 2 directly, regardless of the gate signal from the gate bus line 1. As a result, the point defect in the pixel portion is displayed in an intermediate state, namely, neither a completely luminous point or a completely black point. Such an intermediate state is not easily recognized as a defect, although not being completely normal. On the display screen, the pixel portion appears to be normal.

In this manner, the active matrix liquid crystal display apparatus 110 with a repaired pixel defect can be produced.

As described above, however, when the size of the laser spot is large or when the laser power is high for higher efficiency of the repair work, the laser radiation exerts significant influences on the portions which are not supposed to be provided with laser power as shown in FIG. 4B. Although the projected semiconductor portion 12A and the projected gate metal portion 7 are more easily shortcircuited, the other elements are adversely influenced.

Hereinafter, the optimal conditions for a successful repair operation will be described.

In the following evaluation test, in order to supply a voltage to the extended semiconductor portion 12d, connected to the pixel electrode 3, from the source bus line 2 instead of the TFT 4, the laser light directed to the corner of the overlapping portion 7a was provided from the outside of the active matrix substrate 110A.

The projected semiconductor portion 12A may be melted with the source bus line 2. However, the distance between the portion 12A and the source bus line 2 with the gate insulating layer 13 interposed therebetween is quite long. Therefore, the projected semiconductor portion 12A is melted with the projected gate metal portion 7, which is connected to the source bus line 2 via the contact hole 2A. The laser radiation position is the same for all the pixel electrodes.

The size and shape of the laser spot R need to be determined in consideration of the width of the projected gate metal portion 7 and the width of the projected semiconductor portion 12A. In this evaluation test, the laser spot R was a 4.4 μm×5.8 μm rectangle. For melting, the laser power is sufficient if it can bulge the portions to be melted. Therefore, the laser power for melting is lower than the laser power for cutting (described later). In this evaluation test, the laser power was 4 on the scale of laser apparatus (NRS-09 produced by NTN). The laser light needs to be radiated a sufficiently number of times to melt the conductive layers (portions 12A and 7) with certainty. In this evaluation test, the laser light was radiated once.

Figure 6:
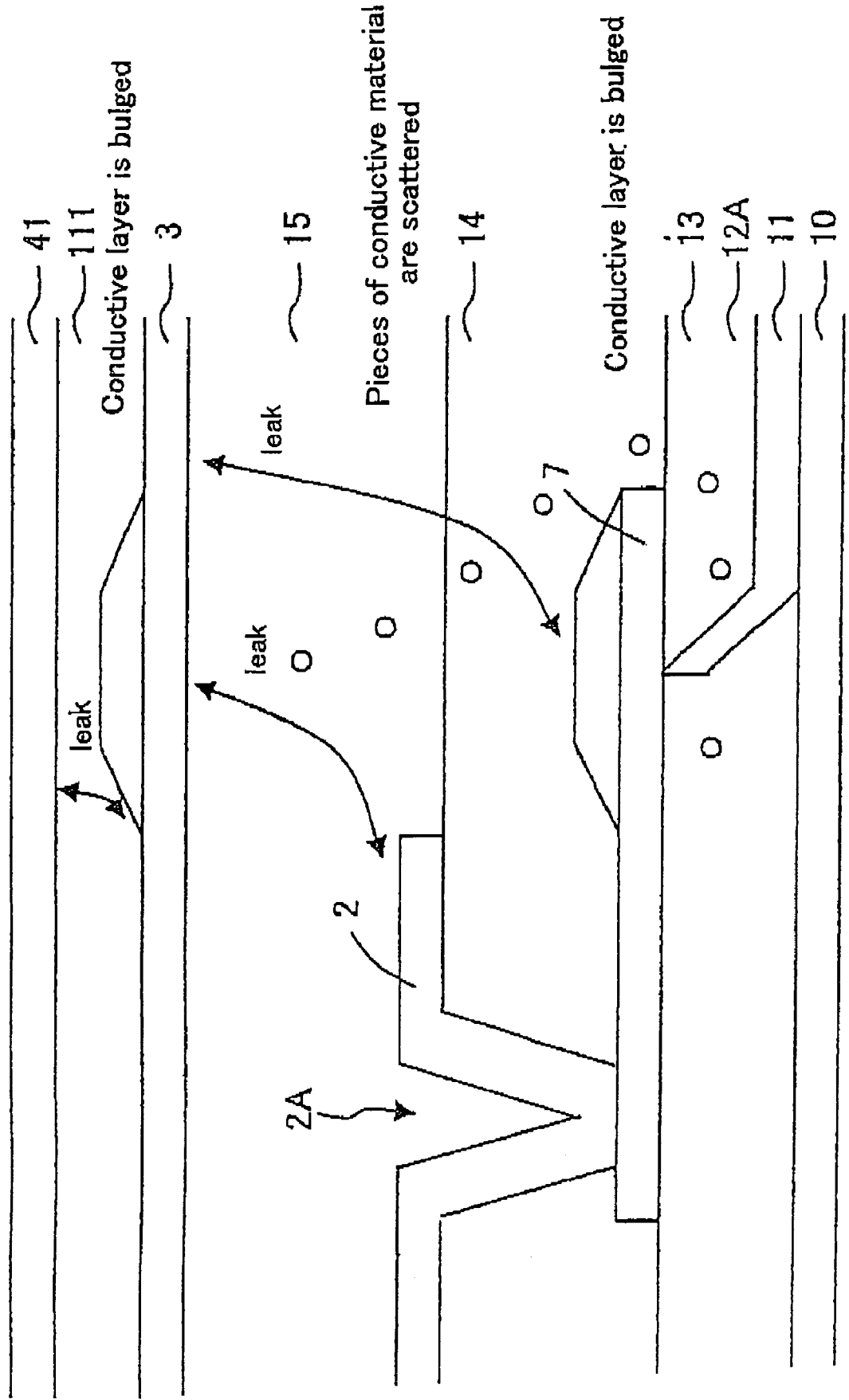
FIG. 6 is a partial cross-sectional view of the active matrix liquid crystal display apparatus in the reference example without a protection layer, illustrating the state after melting.
Figure 7:
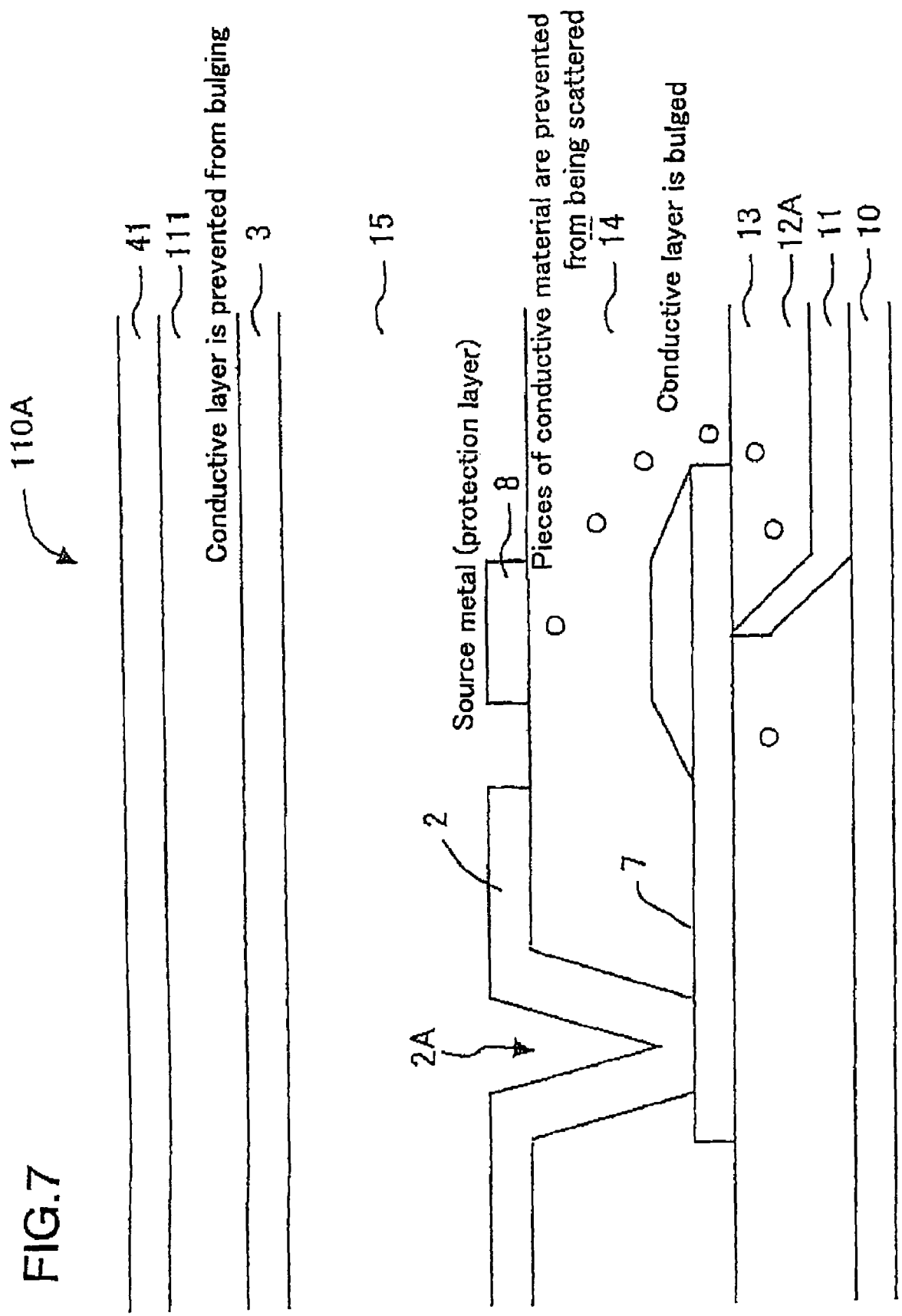
FIG. 7 is a partial cross-sectional view of an active matrix liquid crystal display apparatus according to Example 1 of the present invention with a protection layer, illustrating the state after melting.

In the evaluation test, the above-mentioned optimal conditions were obtained. Still, it is necessary to consider the adverse influences exerted by the laser light on the other elements. Specific examples of the adverse influences are malfunctions caused by a leak as described below with reference to FIGS. 5 and 6. It is important to avoid malfunctions caused by a leak in order to further improve the efficiency of the repair work. With reference to FIGS. 5 through 7, such malfunctions will be described.

FIGS. 5 and 6 are partial cross-sectional views of an active matrix liquid crystal display apparatus in a reference example without the protection layer 8. The alignment layers 17 and 42 are omitted for the sake of simplicity.

FIG. 5 shows the state before the melting operation. As shown in FIG. 5, a TFT substrate including the glass plate 10, the base coat layer 11, the transparent pixel electrode 3 and other elements faces a counter substrate having the transparent counter electrode 41 and a color filter. (CF; not shown). The liquid crystal layer 111 is interposed between the TFT substrate and the counter substrate. When a point defeat is detected, the overlapping portion 7a (represented by the circle) of the projected gate metal portion 7 and the projected semiconductor portion 12A in the pixel portion having the point defect is irradiated with laser light directed from the rear surface of the glass plate 10 and is melted.

FIG. 6 shows the state after the melting operation. The projected semiconductor portion 12A is bulged or curled up and is melted with the projected gate metal portion 7. As a result, the portions 12A and 7 are shortcircuited. Pieces of the conductive material of the portion 12A are scattered, and the projected gate metal portion 7 is also bulged. This may cause a leak between the source bus line 2 and the pixel electrode 3, or a leak between the projected gate metal portion 7 and the pixel electrode 3. Due to excessive laser power, the pixel electrode 3 and the reflection layer 16 (in the case of a reflection type apparatus) are also bulged, which may cause a leak between the pixel electrode 3 and the counter electrode 41.

FIG. 7 is a partial cross-sectional view of the active matrix liquid crystal display apparatus 110 in Example 1 with the protection layer 8. Here also, the alignment layers 17 and 42 are omitted for the sake of simplicity. FIG. 7 shows the state after the melting.

As shown in FIG. 7, the protection layer 8, which is provided above the laser radiation portion (spot), can prevent pieces of the projected semiconductor portion 12A from being scattered to the layers above the protection layer 8. This prevents leaks between, for example, the source bus line 2 and the pixel electrode 3 and between the projected gate metal portion 7 and the pixel electrode 3. Since the protection layer 8 also absorbs the excessive laser power, the pixel electrode 3 and the reflection layer 16 (in the case of a reflection type apparatus) thereon are prevented from bulging. Thus, a leak between the pixel electrode 3 and the counter electrode 41 can be prevented.

The protection layer 8 (formed of the same source metal with the source metal layer 6 and the source bus line 2) is formed above the laser radiation portion in the same step as the source bus line 2. The mask pattern is changed to form a 4.4 μm×5.8 μm rectangle as the protection layer 8. This additional source metal layer (the protection layer 8) should basically have a potential in a floating state in order to realize a simple structure. When it is preferable that the protection layer 8 has the ground potential in order to improve the protection effect, the protection layer 8 may be connected to the ground potential. In this manner, the potential of the protection layer 8 may be adjusted in accordance with the protection effect to be achieved.

The size of the protection layer 8 is basically slightly larger than the size of the laser spot on the overlapping portion 7a. The optimal size of the protection layer 8, however, may be still larger than that, or equal to or smaller than the size of the laser spot on the overlapping portion 7a in consideration of the size of the surrounding elements and the possibility of occurrence of leaks. It is not necessary to absolutely match the size of the protection layer 8 to the size of the laser spot. The shape of the protection layer 8 may be, for example, rectangular, square, circular, or elliptical, and need not necessarily be the same as the shape of the laser spot.

The provision of the protection layer 8 offers another advantage that the laser radiation can be performed using the position of the protection layer 8 as a guide. The position of the protection layer 8 can be easily found from the rear surface of the glass plate 10 owing to the structure of the pixel portion. By using the position of the protection layer 8 as a guide, even an operator who is not very familiar with the structure of the inside of the liquid crystal panel can easily find the position to be melted with certainty.

Figure 12:
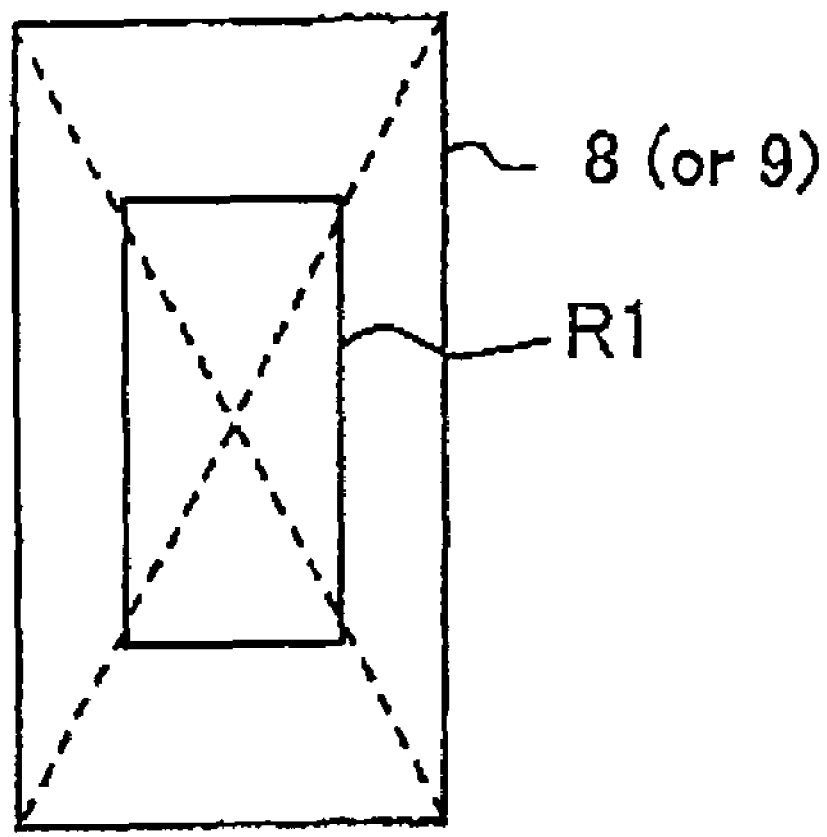
FIG. 12 shows a shape of a protection layer.

It is preferable that the shape of the protection layer 8 is similar to that of the laser spot as shown in FIG. 12. In this case, the intersection of the two diagonal lines of the rectangular protection layer 8 matches the central point of the rectangular laser spot (represented by R1). This is useful to direct the laser light to an accurate position. Even an operator who is not skilled in laser radiation of panels can direct the laser light to a correct position accurately. This improves the repair work efficiency.

FIG. 12 shows the shapes of the protection layer 8 (or 9) and the laser spot R1. As described above, the operator can correctly direct the laser light using the position of the protection layer 8 as a guide. The operator can also determine the shape and size of the laser spot R1 based on the shape and size of the protection layer 8.

For example, the shape and size of the laser spot R1 are set to be the same as those of the protection layer 8. In this case, it can be confirmed that the shape and size of the laser spot R1 are correct based on the protection layer 8. Even an operator who is not very skilled in laser radiation of panels can easily determine and confirm the position, shape and size of the laser spot, which improves the repair work efficiency.

The position, shape and size of the protection layer 8 (or 9) can be applied to the cutting operation described below.

So far, the operation of melting the conductive layers has been described as a type of laser repair work.

Hereinafter, the operation of cutting as another type of laser repair work will be described. Provision of the protection layer 9 above the laser radiation portion offers substantially the same effects as those of the protection layer 8.

Figure 8:
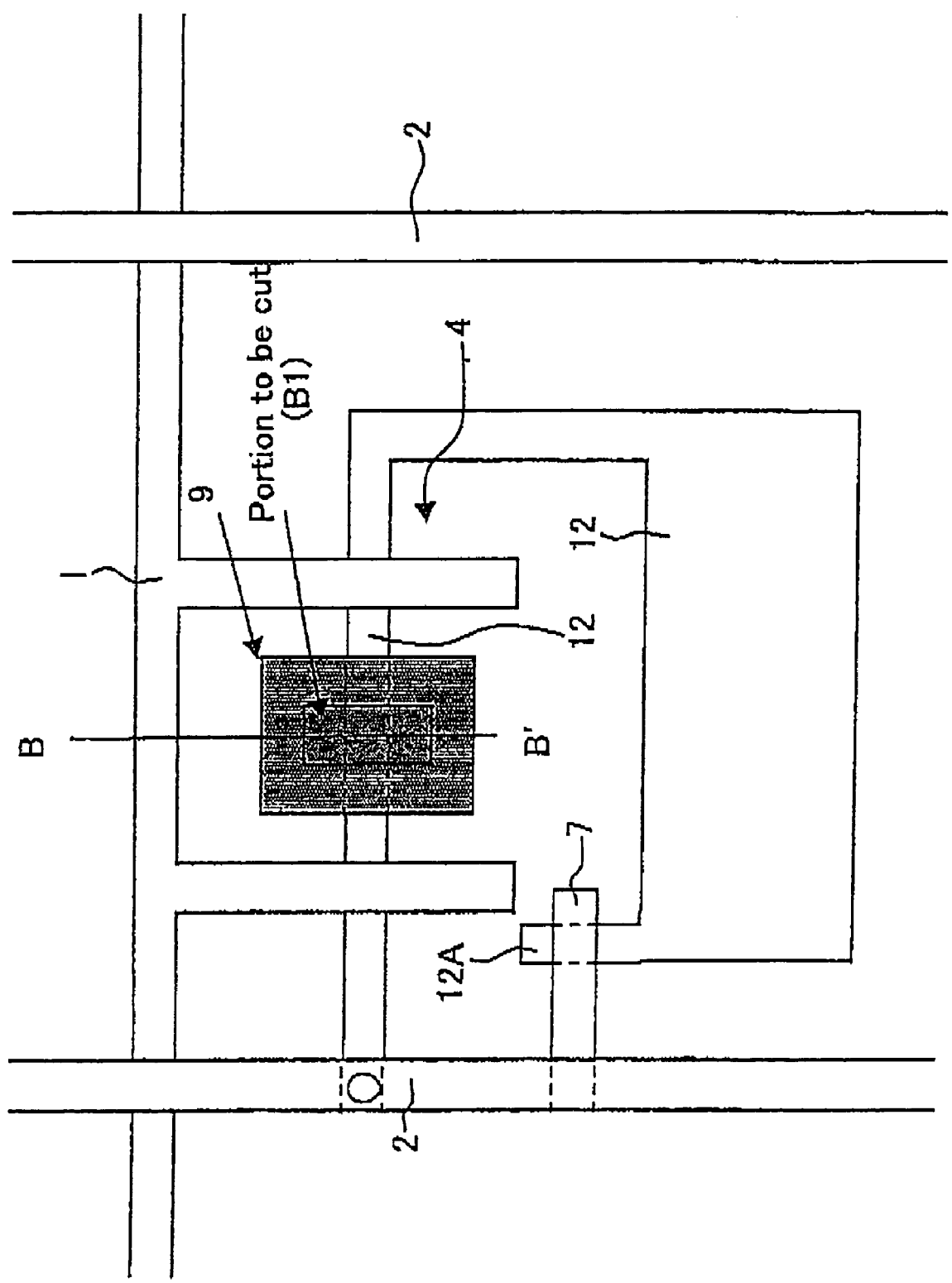
FIG. 8 is a plan view illustrating a portion to be cut in the active matrix substrate shown in FIG. 1A with a protection layer.
Figure 9:
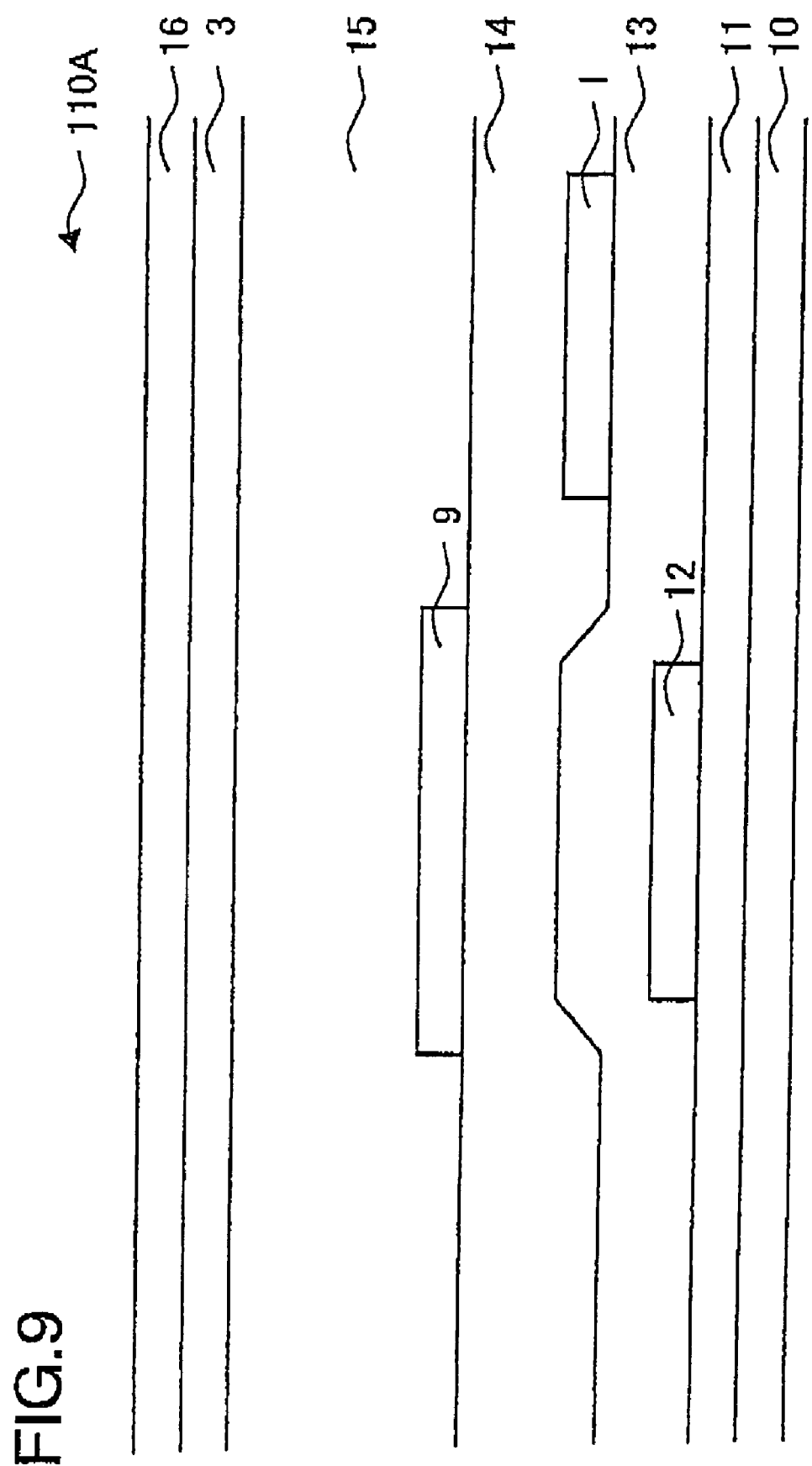
FIG. 9 is a partial cross-sectional view of FIG. 8 taken along line B–B'.
Figure 10:
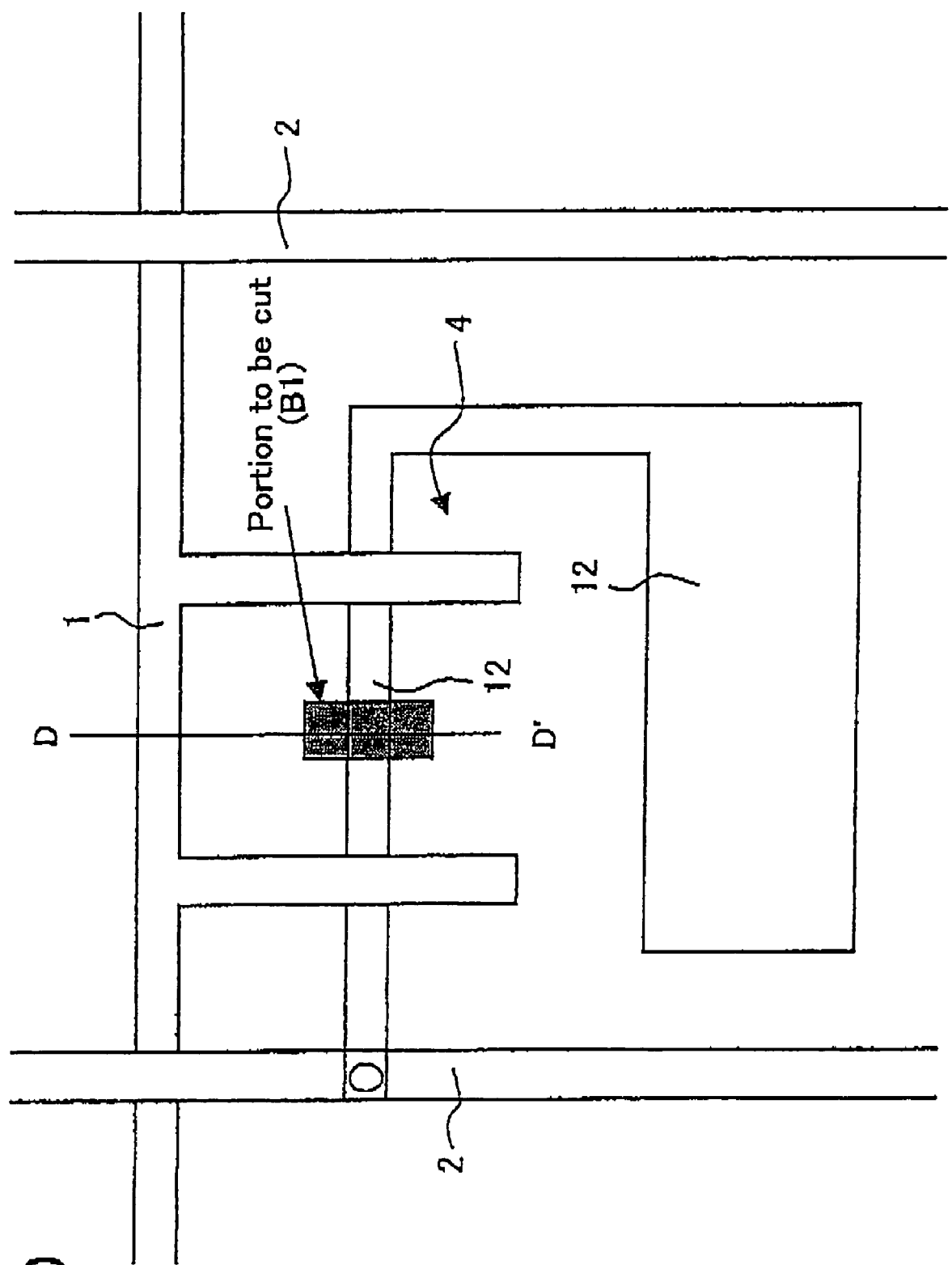
FIG. 10 is a plan view illustrating a portion to be cut in an active matrix substrate in a reference example without a protection layer.
Figure 11:
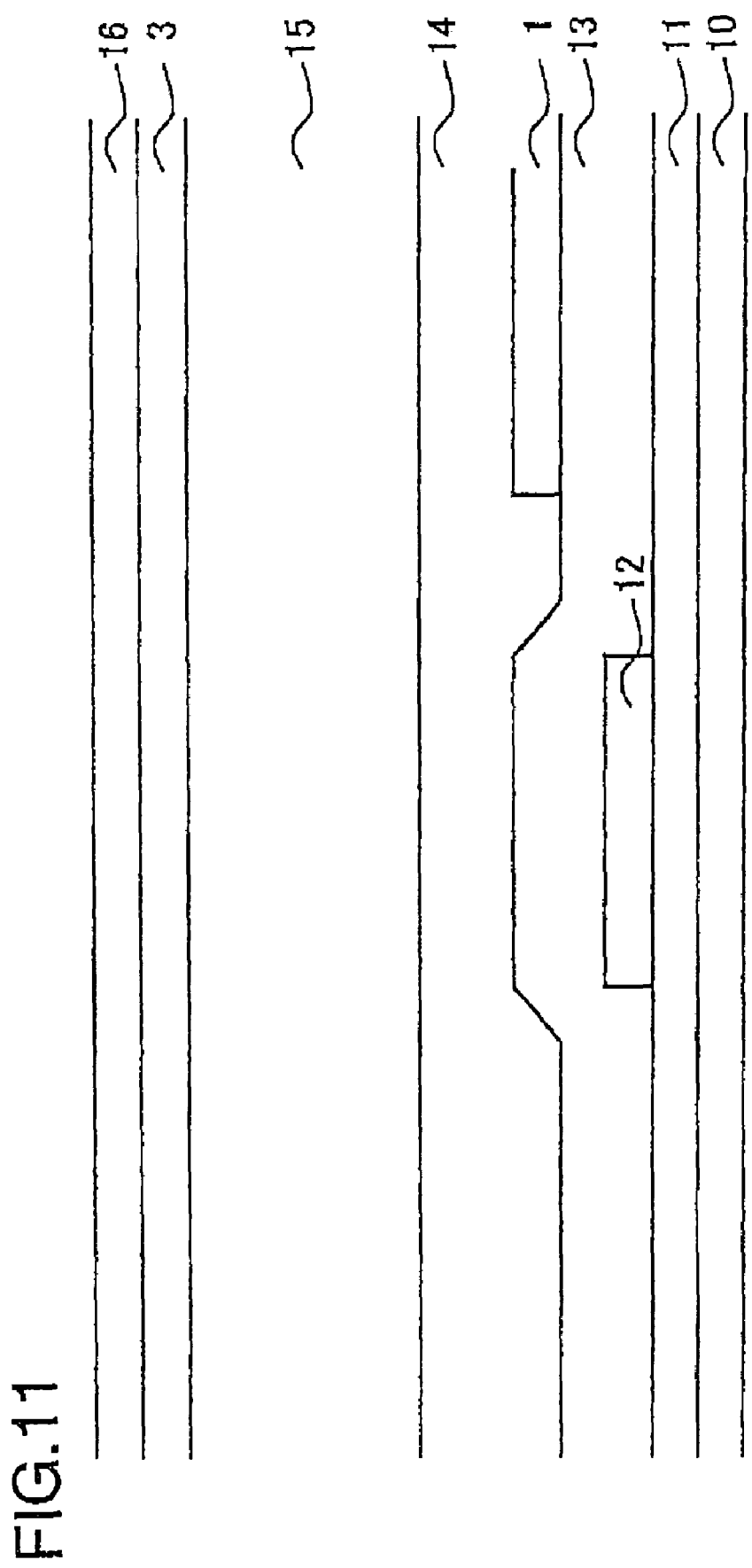
FIG. 11 is a partial cross-sectional view of FIG. 10 taken a long line D–D'.

FIG. 8 shows a portion B1 of the TFT 4 to be cut in the active matrix substrate 110A shown in FIG. 1A according to Example 1 with the protection layer 9. FIG. 9 is a partial cross-sectional view of FIG. 8 taken along line B–B'. FIG. 10 shows a portion B1 of the TFT 4 to be cut in an active matrix substrate in a reference example without the protection layer 9. FIG. 11 is a partial cross-sectional view of FIG. 10 taken long line D–D'.

The active matrix substrate 110A includes the protection layer 9 on the interlayer insulating layer 14, in positional correspondence with the portion B1 to be cut by the laser radiation. The protection layer 9 is formed of the same material as that of the source bus line 2. The active matrix substrate shown in FIGS. 10 and 11 do not include the protection layer 9.

In this example, the portion B1 to be cut is set such that the drain region of the semiconductor layer 12 connected to the pixel electrode 3 is disconnected from the TFT 4. This is necessary in order to directly supply a voltage to the drain region from the source bus line 2 instead of the TFT 4 when a point defect occurs in the pixel portion. Since the active matrix substrate 110A and the counter substrate 110B are already sealed together, laser radiation is directed from the bottom surface of the glass plate 10.

The laser radiation position is the same for all the pixel electrodes. In this evaluation test, the laser light was directed to the drain region in the semiconductor layer 12 between the gates of the two TFTs 4 to cut this portion. The size and shape of the laser spot need to be determined in consideration of the width of the semiconductor layer 12 to be cut. In this evaluation test, the laser spot was a 8.8 μm×4.2 μm rectangle.

For cutting the semiconductor layer 12, it is not sufficient to bulge the semiconductor layer 12. The laser power needs to be sufficiently high to cut the semiconductor layer 12 and should be higher than the laser power used for melting. In this evaluation test, the laser power was 5 on the scale of the laser apparatus. The laser light needs to be radiated a sufficient number of times to cut the semiconductor layer 12 with certainty. In this evaluation test, the laser light was radiated three times.

In the evaluation test, the above-mentioned optimal conditions were obtained. Still, it is necessary to consider the adverse influences exerted on the other elements by the laser light. Specific examples of the adverse influences are malfunctions caused by a leak as described below with reference to FIGS. 13 and 14. It is important to avoid malfunctions caused by a leak in order to further improve the efficiency of the cutting operation.

The evaluation tests showed that when the melting operation and the cutting operations are both performed both with the optimal conditions, the cutting operation requires a larger laser spot size, a high laser power, and a larger number of times of laser radiation than the melting operation. For the cutting operation, it is more necessary to consider the adverse influences exerted by the laser light on the other elements.

Figure 13:
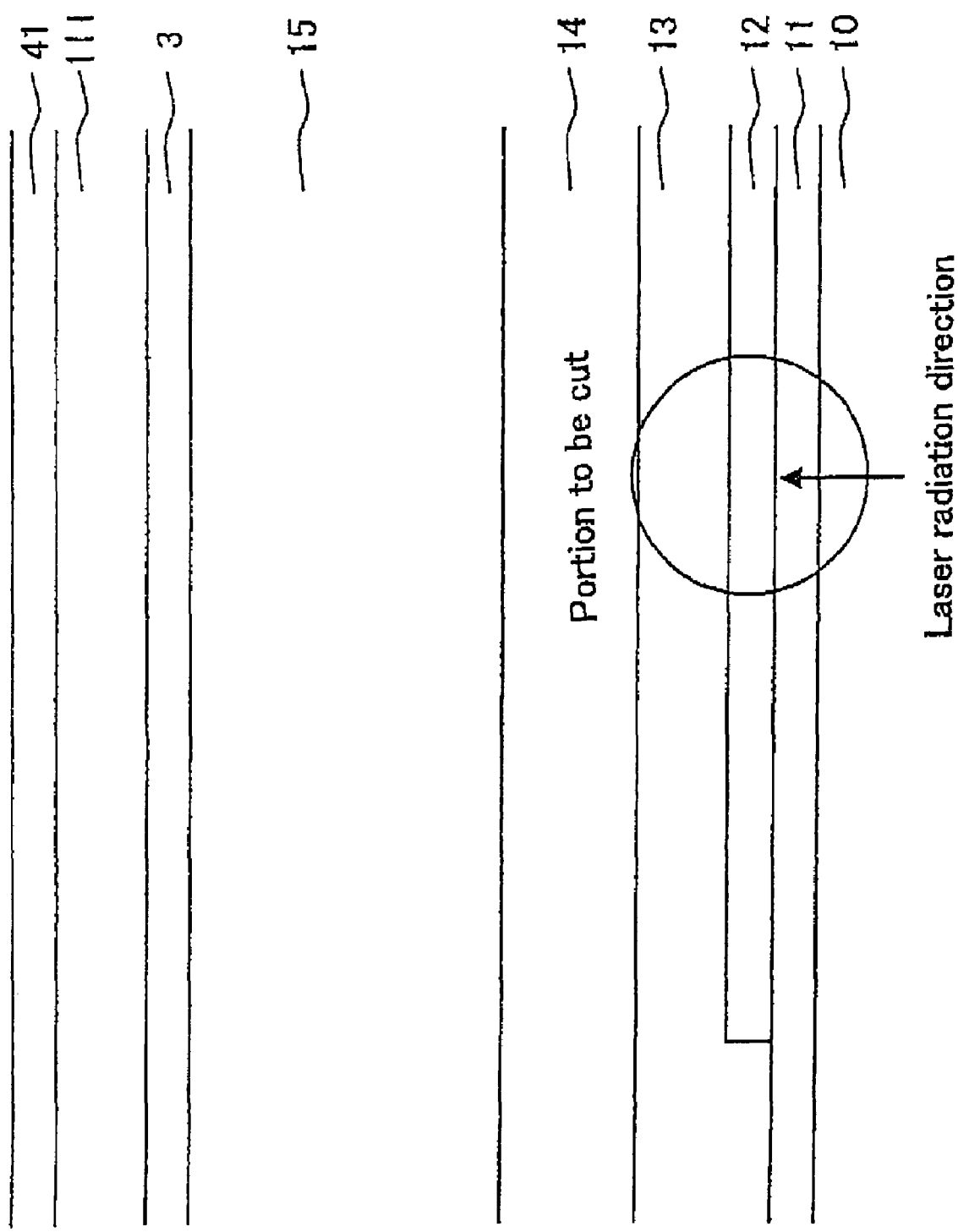
FIG. 13 is a partial cross-sectional view of an active matrix liquid crystal display apparatus in a reference example without a protection layer, illustrating the state before cutting.
Figure 14:
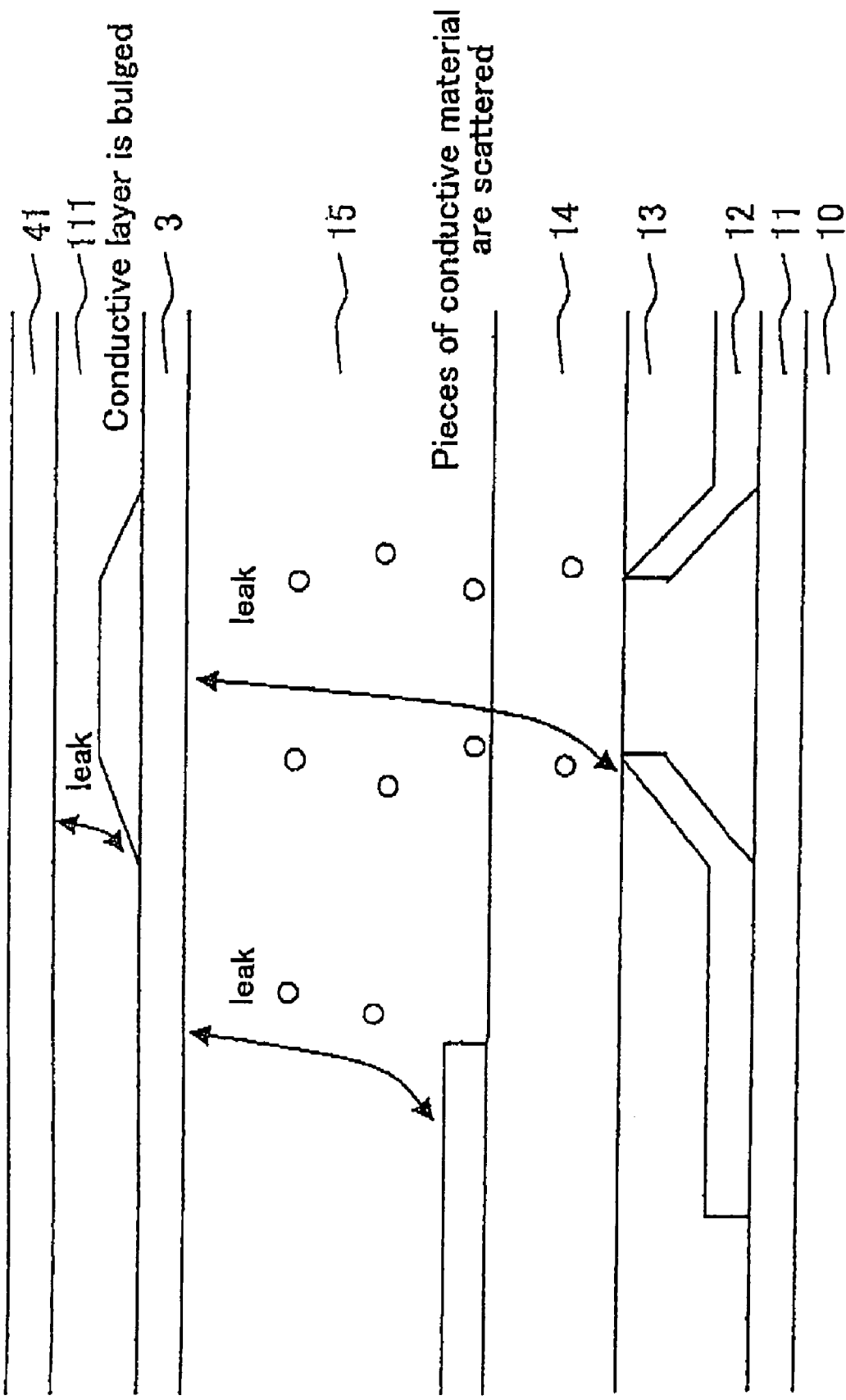
FIG. 14 is a partial cross-sectional view of an active matrix liquid crystal display apparatus in the reference example without a protection layer, illustrating the state after cutting.

FIGS. 13 and 14 are partial cross-sectional views of an active matrix liquid crystal display apparatus in a reference example without the protection layer 9. The alignment layers 17 and 42 are omitted for the sake of simplicity.

FIG. 13 shows the state before cutting. As shown in FIG. 13, the TFT substrate having the glass plate 10, the base coat layer 11, transparent pixel electrode 3 and other elements faces a counter substrate having a transparent counter electrode 41 and a color filter (CF; not shown). The liquid crystal layer 111 is interposed between the TFT substrate and the counter substrate. When a point defect is detected, the portion B1 (see FIG. 8) of the drain region of the semiconductor layer 12 between the gates of the two TFTs 4 is irradiated with laser light directed from the rear surface of the glass plate 10 and is cut.

FIG. 14 shows the state after the cutting. The drain resin of the semiconductor layer 12 is bulged at the portion B1 or curled up and thus is cut. Pieces of the conductive material of the semiconductor layer 12 are scattered. This may cause a leak between the semiconductor layer 12 and the pixel electrode 3, or a leak between the source bus line 2 and the pixel electrode 3. Due to excessive laser power, the pixel electrode 3 and the reflection layer 16 (in the case of a reflection type apparatus) are also bulged, which may cause a leak between the pixel electrode 3 and the counter electrode 41.

Figure 15:
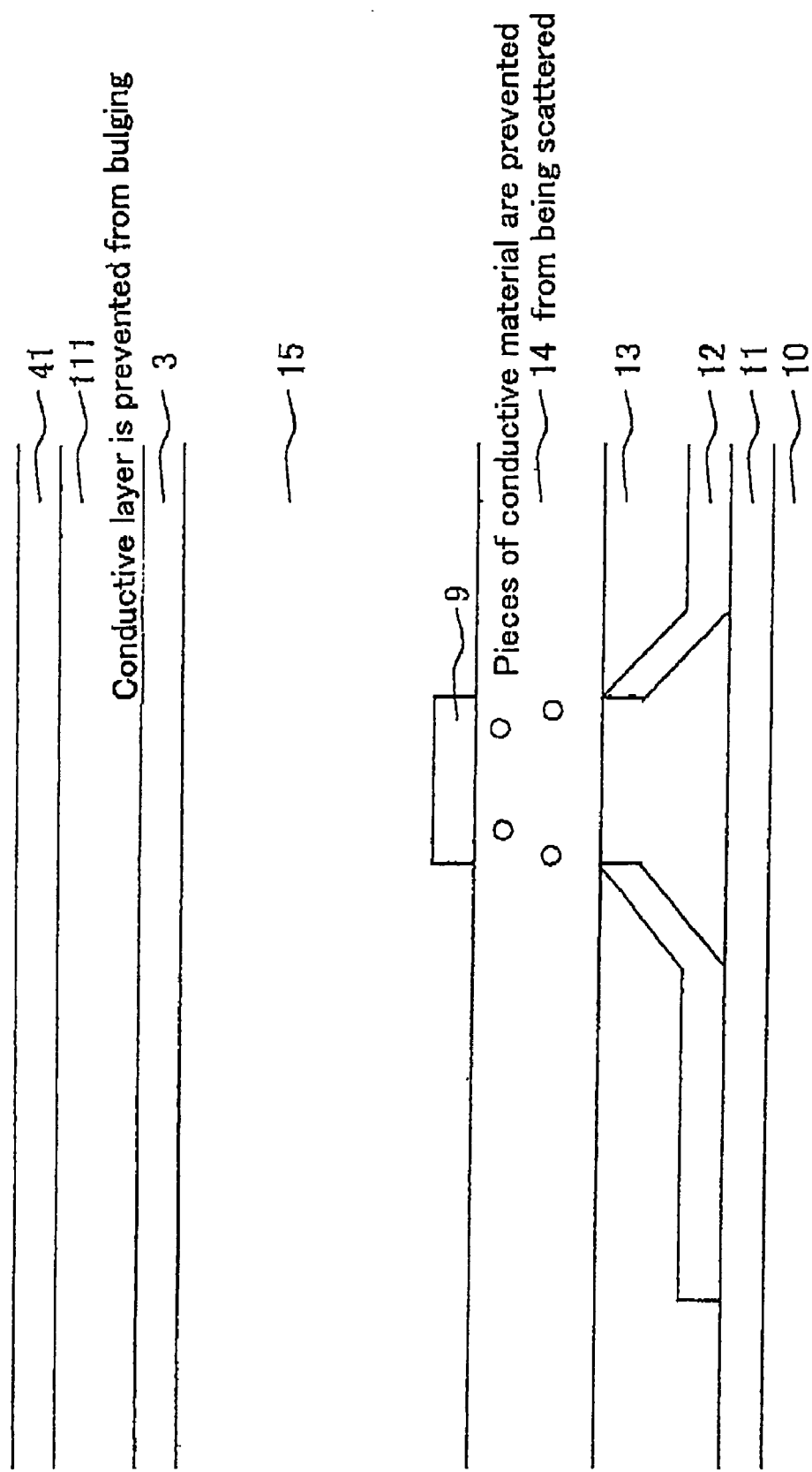
FIG. 15 is a partial cross-sectional view of an active matrix liquid crystal display apparatus according to Example 1 of the present invention with a protection layer, illustrating the state after cutting.

FIG. 15 is a partial cross-sectional view of the active matrix liquid crystal display apparatus 110 in Example 1 with the protection layer 9. Here also, the alignment layers 17 and 42 are omitted for the sake of simplicity. FIG. 15 shows the state after the cutting.

As shown in FIG. 15, the protection layer 9, which is provided above the laser radiation portion, can prevent pieces of the semiconductor layer 12 from being scattered to the layers in the vicinity thereof. This prevents leaks between, for example, the source bus line 2 and the pixel electrode 3 and between the semiconductor layer 12 and the pixel electrode 3. Since the protection layer 9 also absorbs the excessive laser power, the pixel electrode 3 and the reflection layer 16 (in the case of a reflection type apparatus) thereon are prevented from bulging. Thus, a leak between the pixel electrode 3 and the counter electrode 41 can be prevented.

In Example 1, the protection layers 8 and 9 are formed of the same metallic material as that of the source bus line 2 (source SE layer). When possible in consideration of the process conditions, the positional relationship between the layers and the like, the protection layers 8 and 9 may be formed of the same metallic material as that of the gate bus line 1 (GE layer). Alternatively, the protection layers 8 and 9 may be formed of a material which is not used for the other layers, if an advantage is provided, although an additional step is required. The materials for the protection layers 8 and 9 are not limited to the source metal material or the gate metal material.

In Example 1, the two protection layers are provided above the laser radiation portions which are provided for repairing a point defect. More specifically, the protection layer 8 is provided for absorbing the excessive laser power and preventing pieces of the conductive material from being scattered at the time of melting. The protection layer 9 is provided for absorbing the excessive laser power, preventing pieces of the conductive material from being scattered, and preventing the conductive layer from bulging at the time of cutting. The present invention is not limited to this structure. Either the protection layer 8 or the protection layer 9 may be provided, or three or more protection layers may be provided.

EXAMPLE 2

In Example 2 according to the present invention, a spacer member (PS) for adjusting the distance between the active matrix substrate and the counter substrate of an active matrix liquid crystal display apparatus is provided above the laser radiation portion so as to be used also for repairing a point defect. The spacer member acts to prevent pieces of the conductive material from being scattered and to prevent the conductive layer from bulging.

Figure 17A:
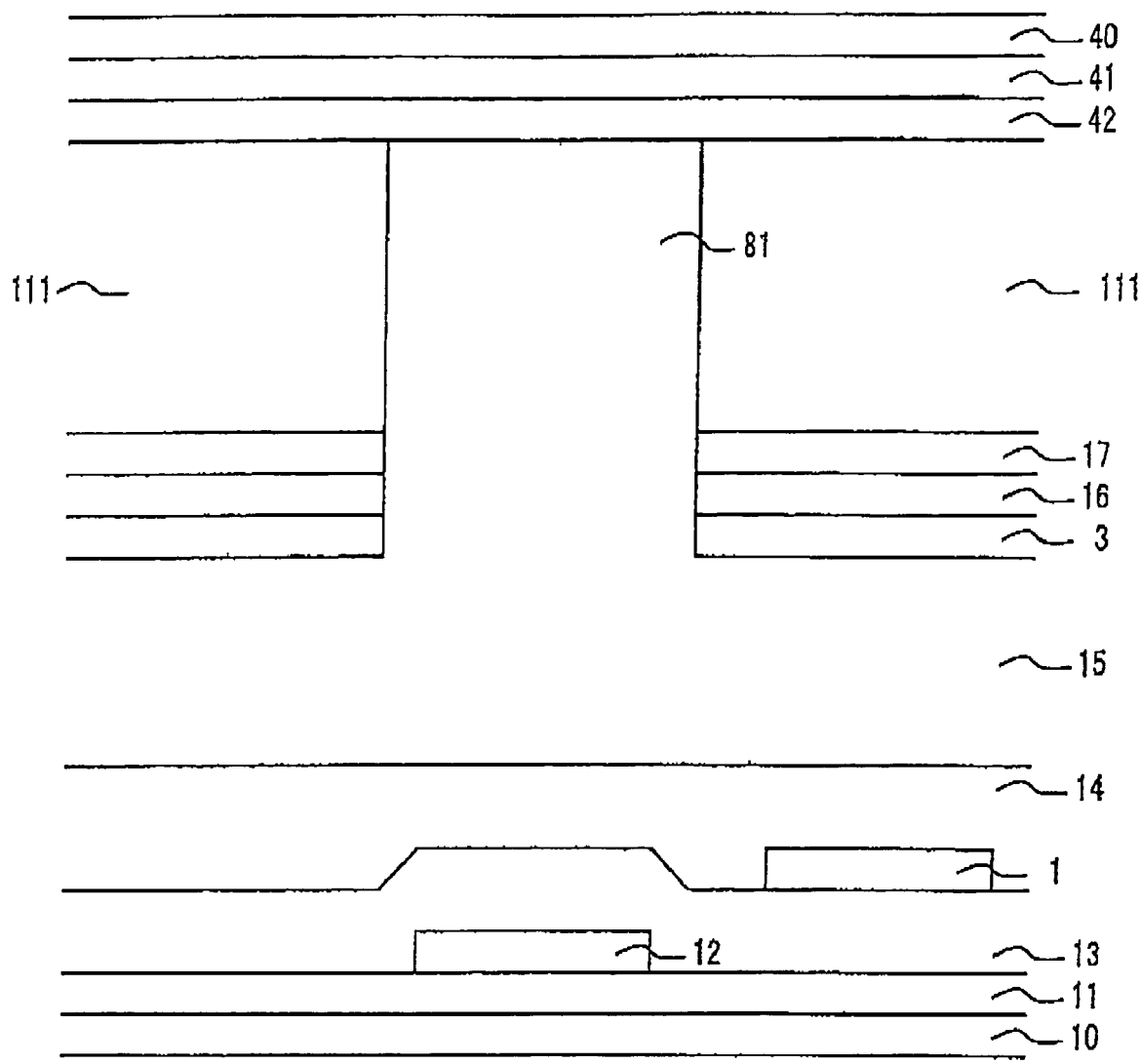
FIG. 17A is a partial cross-sectional view of FIG. 16 taken along line C–C'.
Figure 18:
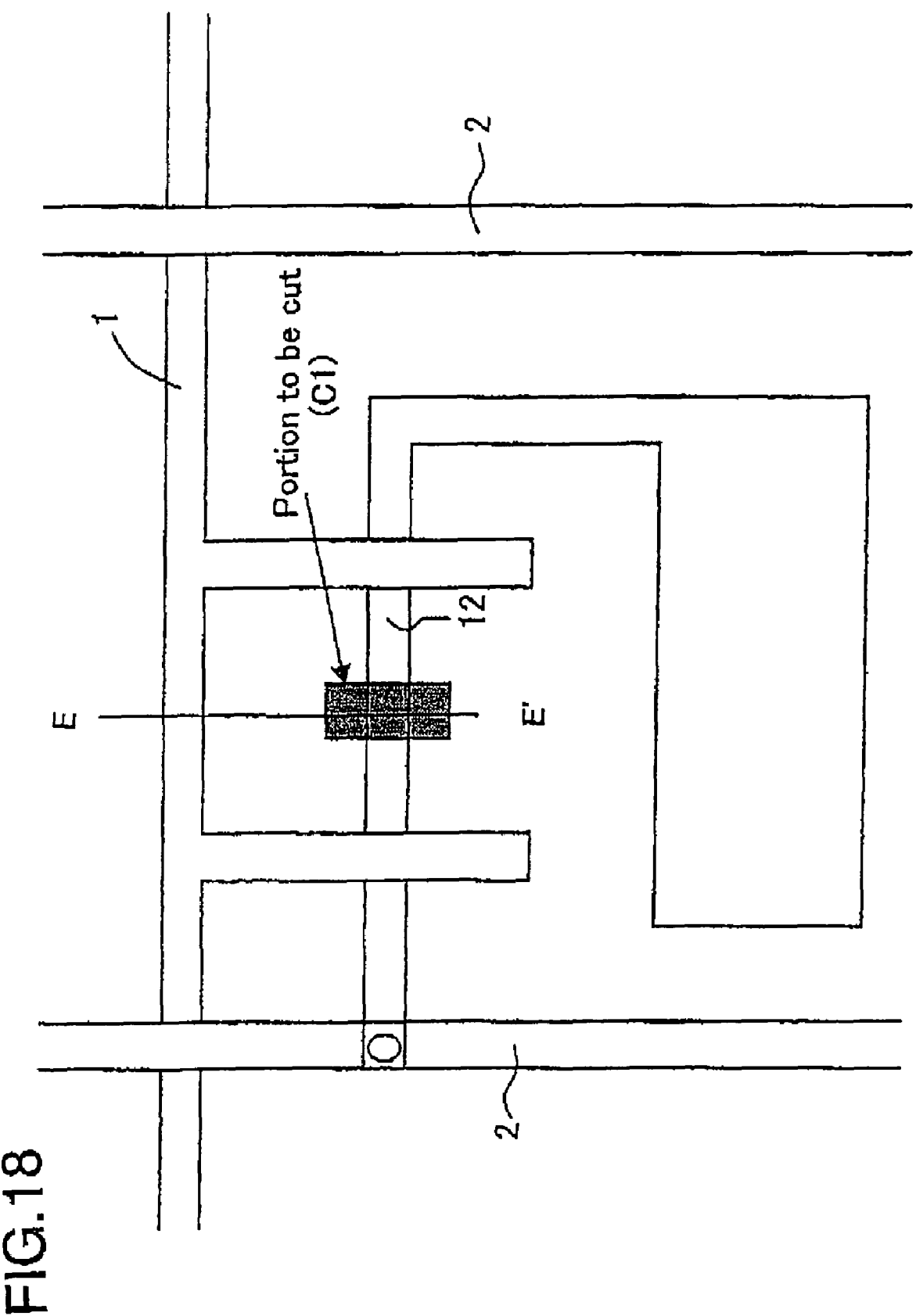
FIG. 18 is a plan view illustrating a portion to be cut in an active matrix liquid crystal display apparatus in a reference example without a spacer member.
Figure 19:
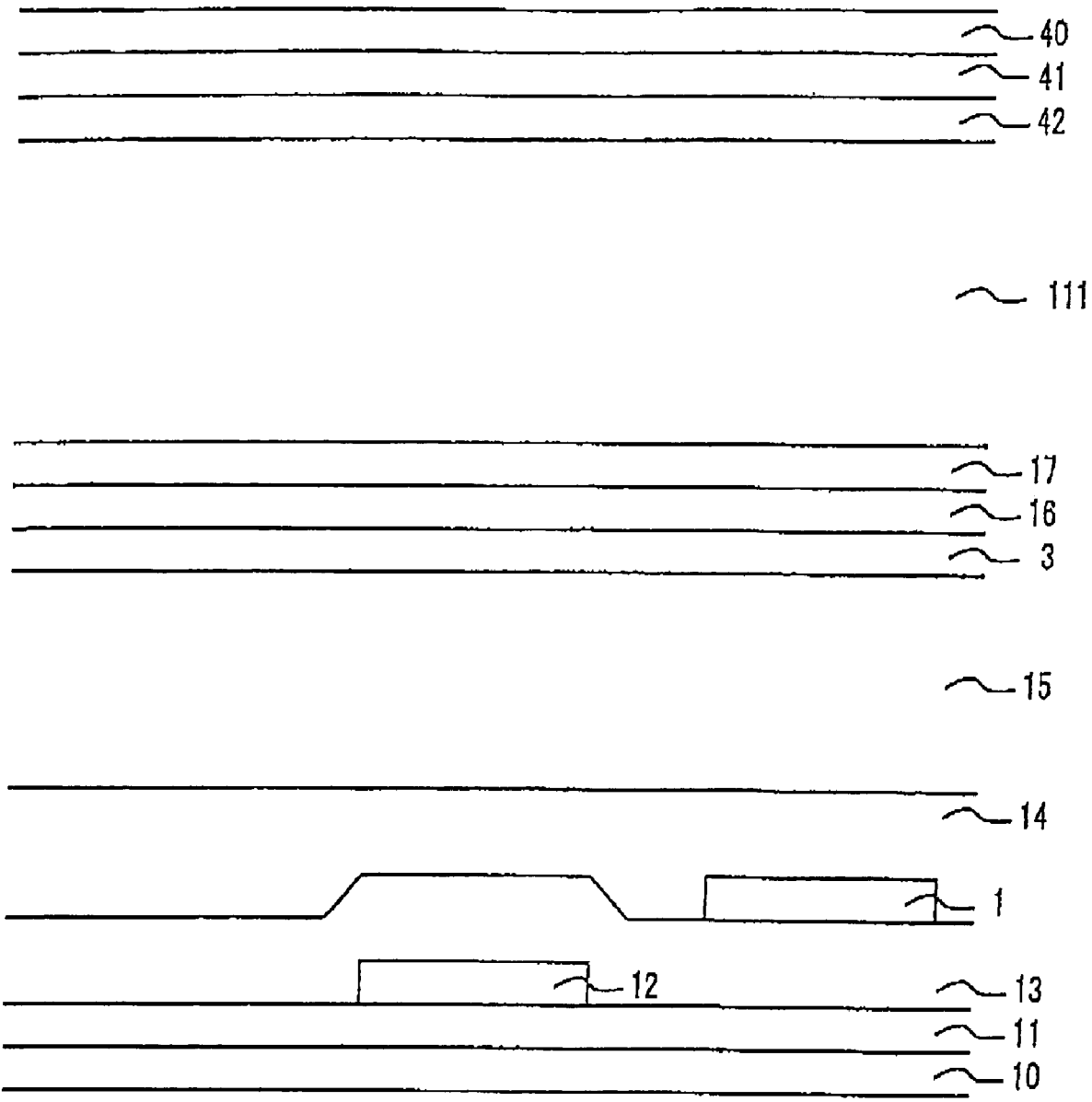
FIG. 19 is a partial cross-sectional view of FIG. 18 taken a long line E–E'.

FIG. 16 shows a portion C1 to be cut in an active matrix liquid crystal display apparatus according to Example 2 of the present invention. The portion C1 is between the gates of the two TFTs 4 of an active matrix substrate of the active matrix liquid crystal display apparatus. FIG. 17A is a partial cross-sectional view of FIG. 16 taken along line C–C'. FIG. 18 shows a portion C1 to be cut in an active matrix liquid crystal display apparatus in a reference example. FIG. 19 is a partial cross-sectional view of FIG. 18 taken a long line E–E'. In FIGS. 16 and 18, the pixel electrode 3 is omitted for the sake of simplicity.

As shown in FIGS. 16 and 17A, the active matrix liquid crystal display apparatus In Example 2 includes a wall-like spacer member (PS) 81 provided between the gates of the two TFTs 4. The active matrix liquid crystal display apparatus shown in FIGS. 18 and 19 does not include such a spacer member.

As shown in FIGS. 16 and 17A, the wall-like spacer member 81 is provided above the laser-radiation portion for cutting. The spacer member 81 is formed integrally with the resin layer 15 and projects from the top surface of the alignment layer 17 of the active matrix substrate by a prescribed height. The prescribed height corresponds to the distance between the two substrates. The spacer member 81 acts as a second protection member for preventing pieces of the conductive material from being scattered and for preventing the conductive layer from bulging.

Conventionally, two technologies are known for securing the precision of the cell thickness (distance between the two substrates) of a liquid crystal display apparatus: use of PS (cylindrical spacers) and use of PB (spherical beads). The spherical beads are scattered before the two substrates are combined together, and the cell thickness is secured by the size (height or diameter) of the spherical beads. When being scattered, the positions of the spherical beads are not fixed. The spherical beads are often used for transmission type liquid crystal display apparatuses. The cylindrical spacers are fixed at prescribed positions before the two substrates are combined together, and the cell thickness is secured. Especially recently, the cylindrical spacers are often used for semi-transmission type liquid crystal display apparatuses having both a transmission display mode and a reflection display mode.

In the case of a semi-transmission type liquid crystal display apparatus, it is often preferable to direct the laser light to a light reflection area than to a light transmission area. When the laser light is directed to the light transmission area, the transmittance of the apparatus is reduced in correspondence with the size of the laser radiation portion. When the laser light is directed to the light reflection area (to the reflection layer 16), the transmittance of the apparatus is not influenced. For this reason, the laser light is often directed to the light reflection area. Therefore, the spacer member 81 is provided in the light reflection area.

Figure 20:
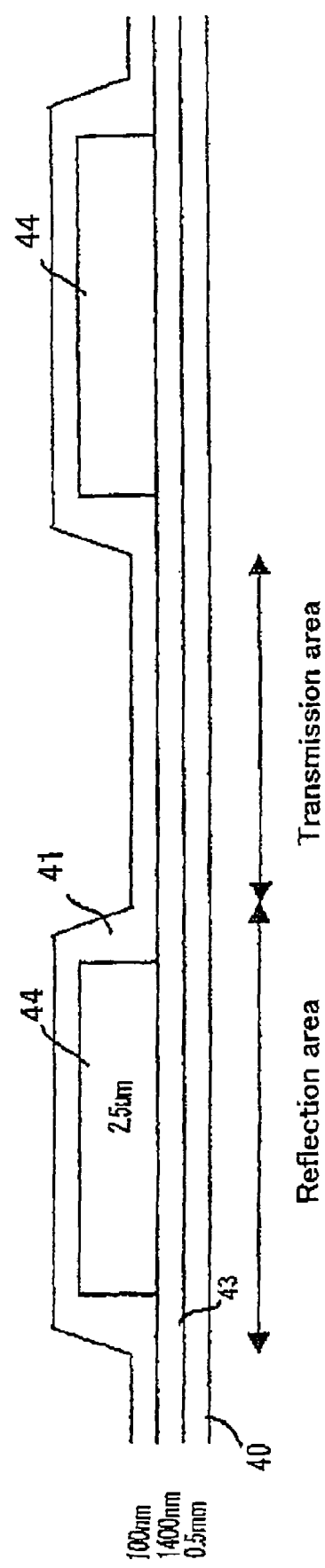
FIG. 20 is a partial cross-sectional view of an active matrix counter substrate of a semi-transmission type active matrix liquid crystal display apparatus in a reference example without a spacer member.
Figure 21:
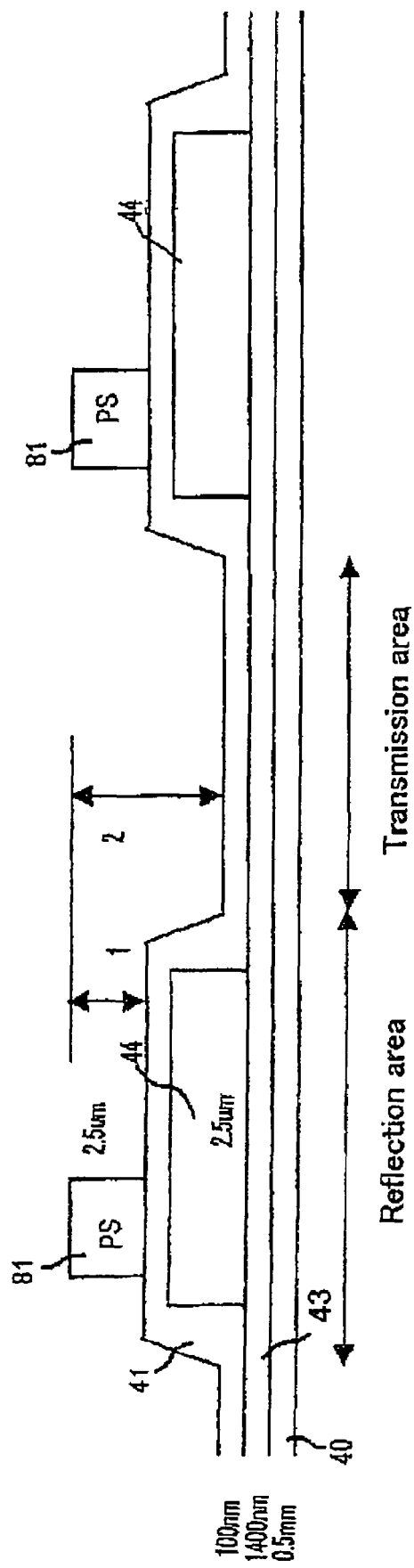
FIG. 21 is a partial cross-sectional view of an active matrix counter substrate of a semi-transmission type active matrix liquid crystal display apparatus according to Example 2 of the present invention, with a spacer member.

With reference to FIGS. 20 and 21, a semi-transmission type liquid crystal display apparatus will be described. FIG. 20 shows a counter substrate of a semi-transmission type liquid crystal display apparatus according to Example 2 including the spacer member 81. The spacer member 81 is a cylindrical spacer (PS). FIG. 21 shows a counter substrate of a semi-transmission type liquid crystal display apparatus in a reference example without the spacer member 81. In a semi-transmission type liquid crystal display apparatus, the cell thickness of the light reflection area should be ½ of the cell thickness of the light transmission area. As shown in FIGS. 20 and 21, each counter substrate includes a glass plate 40, a color filter layer 43 provided thereon, a color (white) filter 44 provided thereon only in the reflection area, and a transparent counter electrode 41 provided on the color filter layer 43 so as to cover the color (white) filter 44. By providing the color (white) filter 44 only in the reflection area, the cell thickness is adjusted. When light needs to be shielded, a black matrix (BM; not shown) may be provided on the glass plate 40.

In FIG. 21, the size and shape of the color (white) filter 44 need to be adjusted to account for the provision of the spacer member 81. Therefore, the spacer members 81 need to be cylindrical spacers (PS) which are provided on the TFT substrate or the counter substrate at fixed positions, not spherical beads which are scattered before the substrates are combined together.

In the case where the spacer member (PS) 81 is provided on the TFT substrate, the spacer member (PS) 81 can be usually formed of a resin. Therefore, the spacer member (PS) 81 can be formed of the same material as, and in the same step as, the resin layer 15. Namely, the spacer member (PS) 81 can be integrally formed with the resin layer 15. The spacer member (PS) 81 can also be formed by adding an additional resin layer after the resin layer 15 is formed.

The material of the spacer member (PS) 81 is not limited to a resin. When necessary, the spacer member (PS) 81 may be formed of a non-resin material although this requires another step. In this case, as shown in FIG. 17B, the transparent pixel electrode 3 and the reflection layer 16 may be formed before the spacer member (PS) 81 is formed.

Figure 17B:
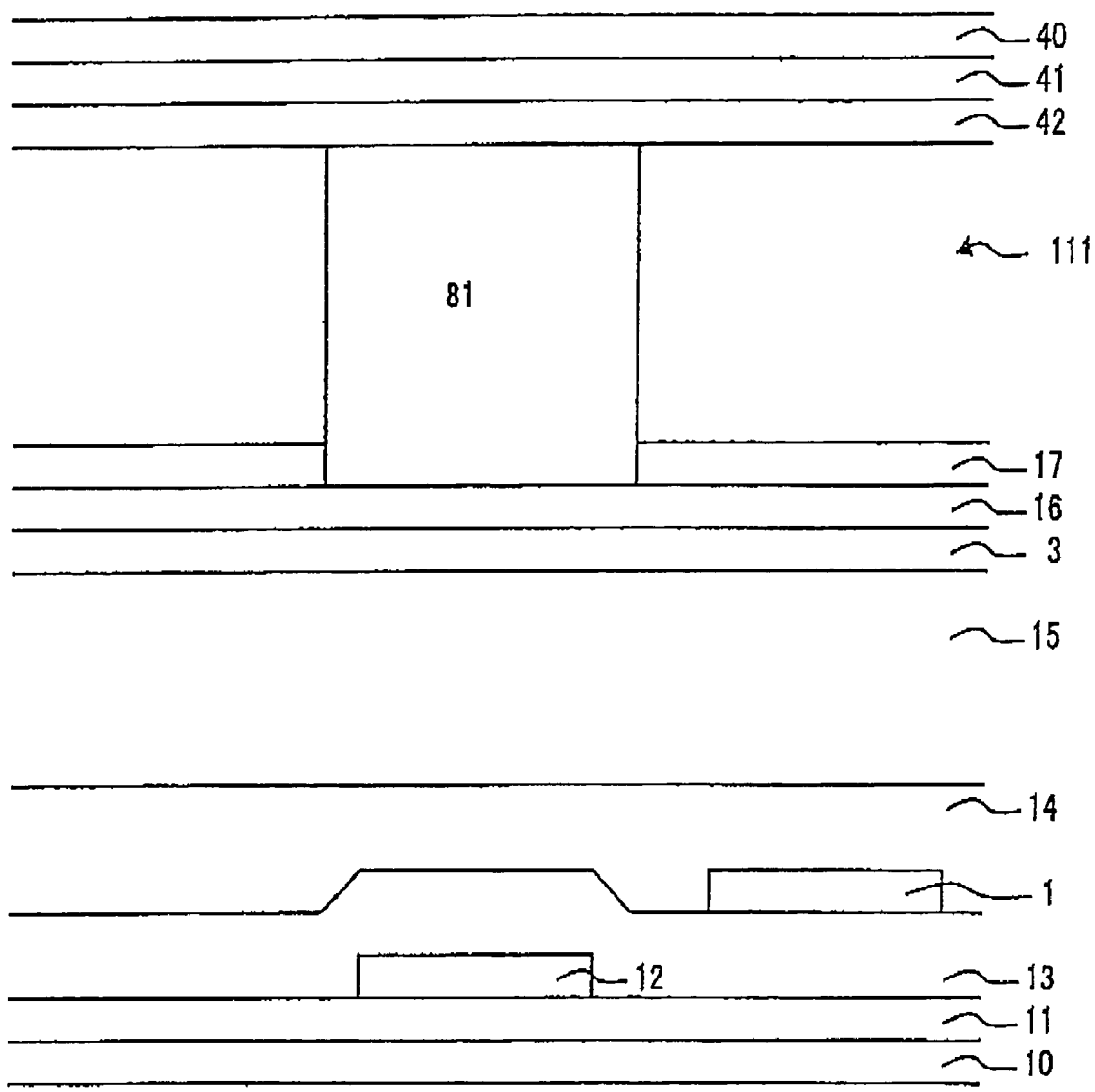
FIG. 17B shows a modification of FIG. 17A.

Even in the case where the spacer member (PS) 81 is formed of the same material as that of the resin layer 15, the transparent pixel electrode 3 and the reflection layer 16 may be formed before the spacer member (PS) 81 is formed (FIG. 17B). The resin layer 15 and the spacer member (PS) 81 are formed in two separate steps.

In the case where the spacer member (PS) 81 is formed of a resin, the spacer member (PS) 81 can be provided above the laser radiation portion. Although the spacer member (PS) 81 cannot absorb the excessive laser power, the spacer member (PS) 81 can prevent the pixel electrode 3 (and the reflection layer 16) from bulging even when these layers tend to bulge became of excessive laser power. The spacer member (PS) 81 can also prevent pieces of the pixel electrode 3 (and the reflection layer 16) from being scattered even when these layers tend to be scattered. Thus, leaks and other malfunctions are prevented during the malting operation and the cutting operation of laser repair, and thus the efficiency of the laser repair work is improved.

The reflection layer (electrode) 16 formed of a conductive material (aluminum) is provided on the transparent pixel electrode 3. The reflection layer 16 absorbs excessive laser power and so is adversely influenced, although excessive laser power does not adversely influence the transparent pixel electrode 3 substantially.

Figure 22:
FIG. 22 is a partial cross-sectional view of an active matrix counter substrate of a transmission type active matrix liquid crystal display apparatus in a reference example without a spacer member.
Figure 23:
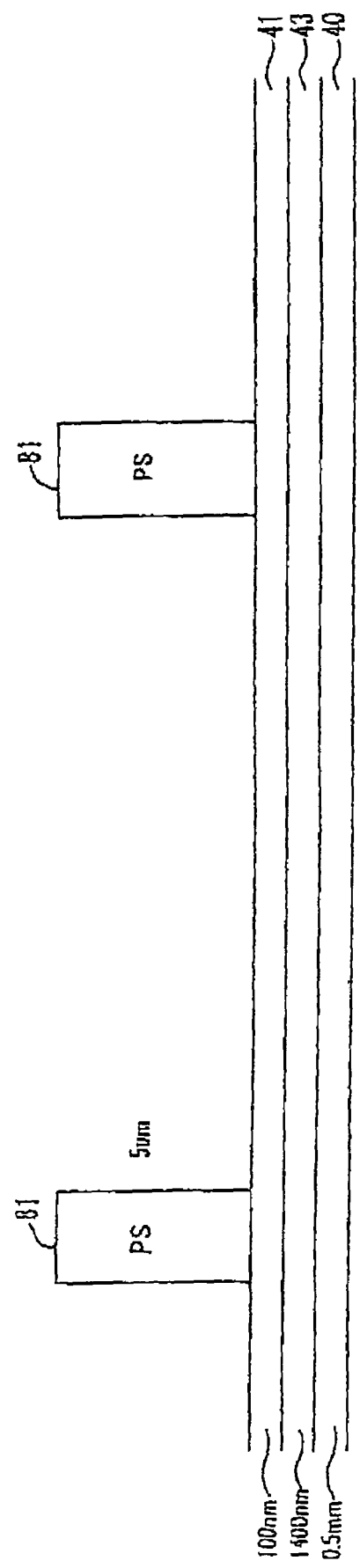
FIG. 23 is a partial cross-sectional view of an active matrix counter substrate of a transmission type active matrix liquid crystal display apparatus according to Example 2 of the present invention, with a spacer member.

FIG. 22 is a partial cross-sectional view of a counter substrate (color filter or substrate) of a transmission type liquid crystal display apparatus in a reference example without the spacer member (PS) 81. FIG. 23 is a partial cross-sectional view of a counter substrate (CF color filter substrate) of a transmission type liquid crystal display apparatus according to Example 2 including the spacer member (PS) 81.

The counter substrate shown in FIG. 22 includes a glass plate 40, a color filter (CF) layer 43, and a transparent counter electrode 41 provided in this order.

The counter substrate shown in FIG. 23 includes a glass plate 40, a color filter (CF) layer 43 provided therein, a transparent counter electrode 41 provided thereon, and a spacer member (PS) 81 provided thereon.

The counter substrate shown in FIG. 23 is produced as follows. The glass plate 40 having a thickness of about 0.5 mm is provided. The color filter layer 43 is formed thereon. The transparent counter electrode 41 is provided thereon by sputtering to a thickness of about 100 nm and patterned as prescribed.

On the counter substrate, and also on the TFT substrate, an alignment (PI) layer is provided and rubbed as prescribed. On the transparent alignment (PI) layer of the counter electrode 41, the spacer member (PS) 81 is provided. The two substrates are combined together, and a liquid crystal layer 111 is enclosed in the space between the two substrates.

Figure 24:
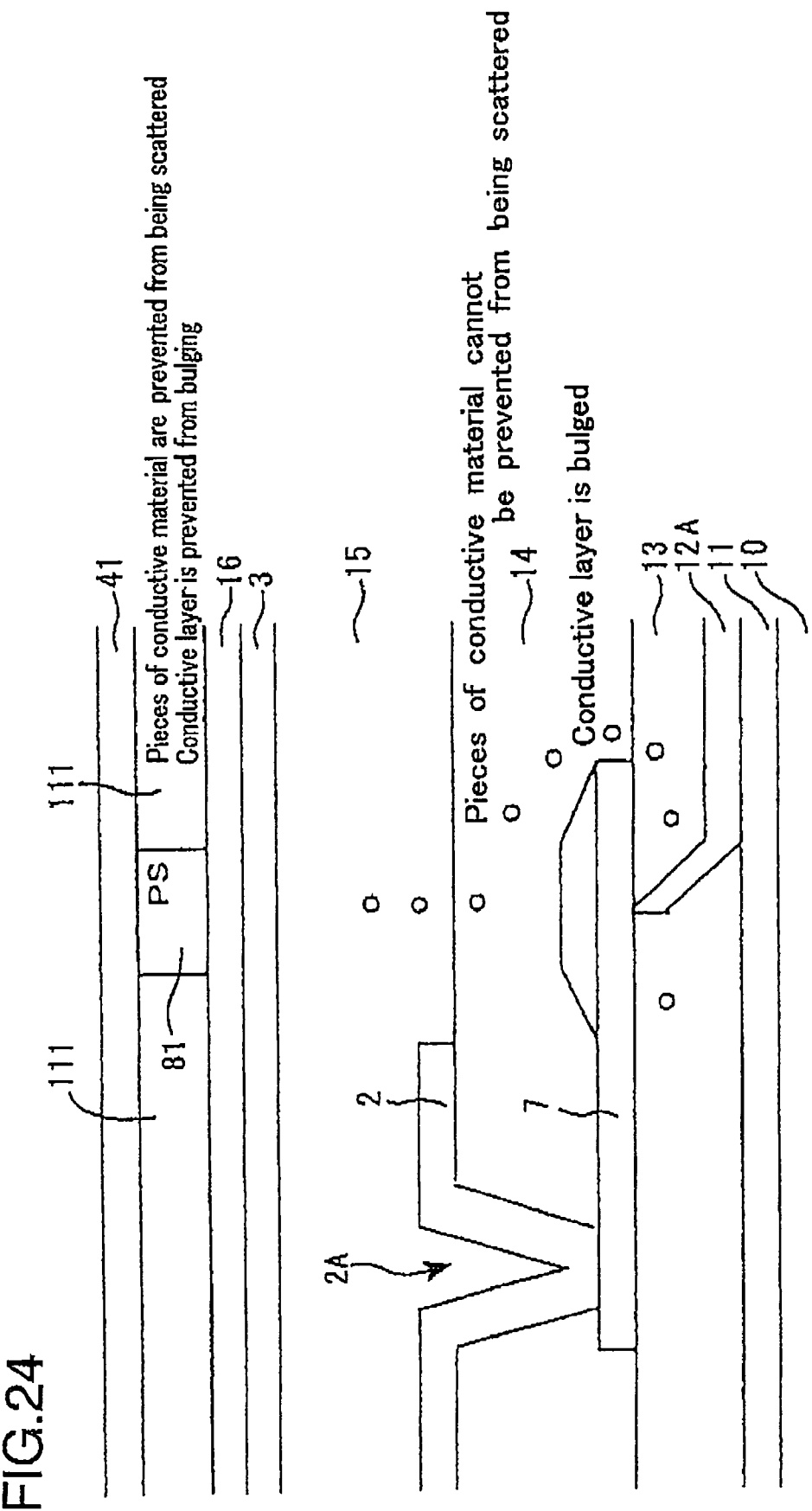
FIG. 24 is a partial cross-sectional view of the active matrix liquid crystal display apparatus according to Example 2 including a spacer member, illustrating the state after melting.
Figure 25:
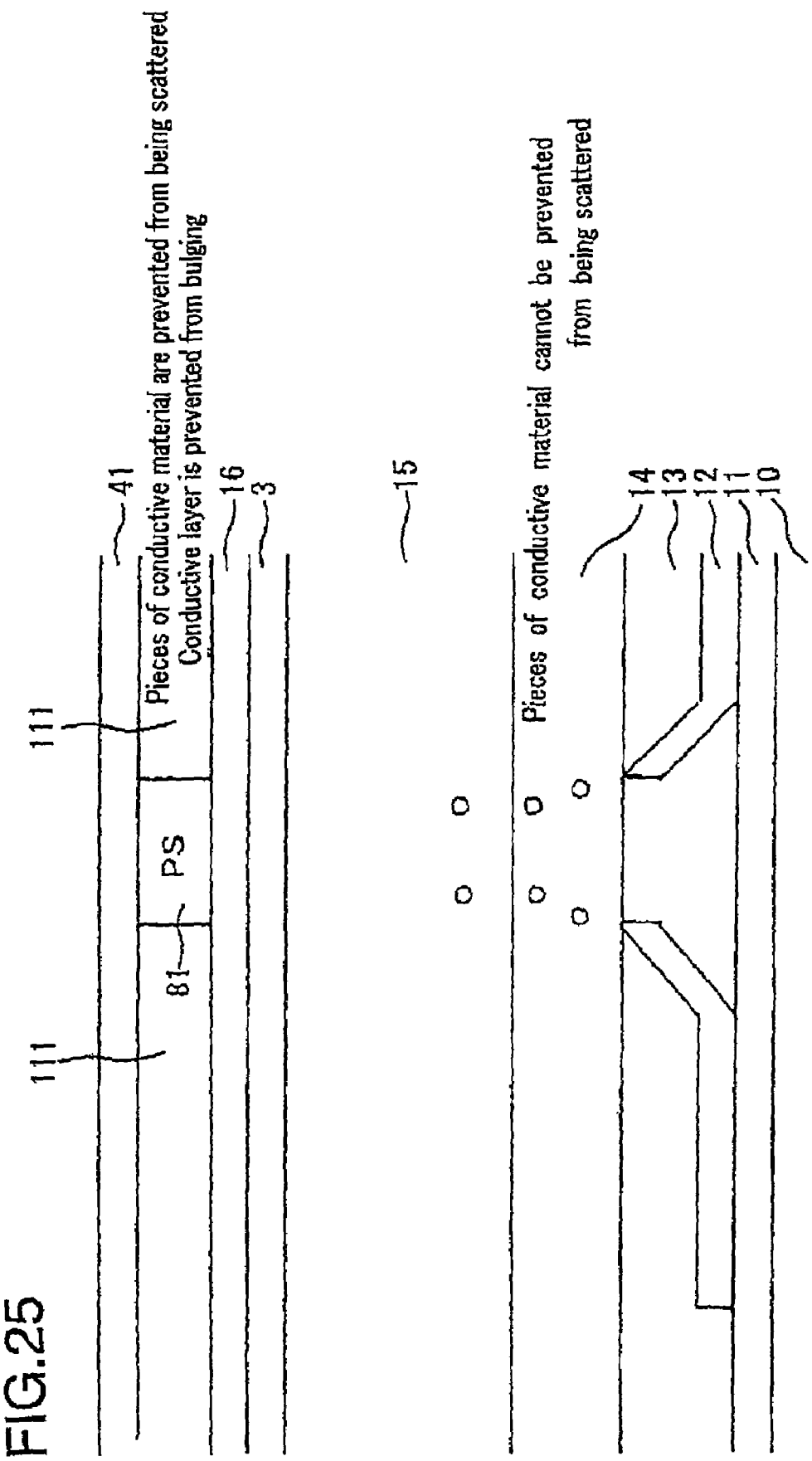
FIG. 25 is a partial cross-sectional view of the active matrix liquid crystal display apparatus according to Example 2 including a spacer member, illustrating the state after cutting.

FIG. 24 is a partial cross-sectional view of the active matrix liquid crystal display apparatus according to Example 2 including the spacer member (PS) 81, illustrating the state after the melting. FIG. 25 is a partial cross-sectional view of the active matrix liquid crystal display apparatus according to Example 2 including the spacer member (PS) 81, illustrating the state after the cutting.

In Example 2, the spacer member (PS) 81 is provided above the laser radiation portion for melting. Therefore, as shown in FIG. 24, the pixel electrode 3 and the reflection layer 16 are prevented from bulging and from being scattered despite excessive laser power.

Also in Example 2, the spacer member (PS) 81 is provided above the laser radiation portion for cutting. Therefore, as shown in FIG. 25, the pixel electrode 3 and the reflection layer 16 are prevented from bulging and from being scattered despite excessive laser power.

Thus, leak and other malfunctions are prevented from occurring during the laser repair operation, which improves the efficiency of the melting operation and cutting operation of laser repair.

In Example 2, the spacer member (PS) 81 is usually cylindrical and has a diameter of about 9 μm. When the diameter of the spacer member (PS) 81 is designed to be too small, it is difficult to form the spacer member (PS) 81 and the cell thickness may not be secured due to deformation of the spacer member (PS) 81. The size of the spacer member (PS) 81 needs to be basically larger than the size of the laser spot in order to prevent the leaks.

EXAMPLE 3

In Example 3 according to the present invention, a spacer member (PS) 82 is provided on the counter substrate.

Figure 26:
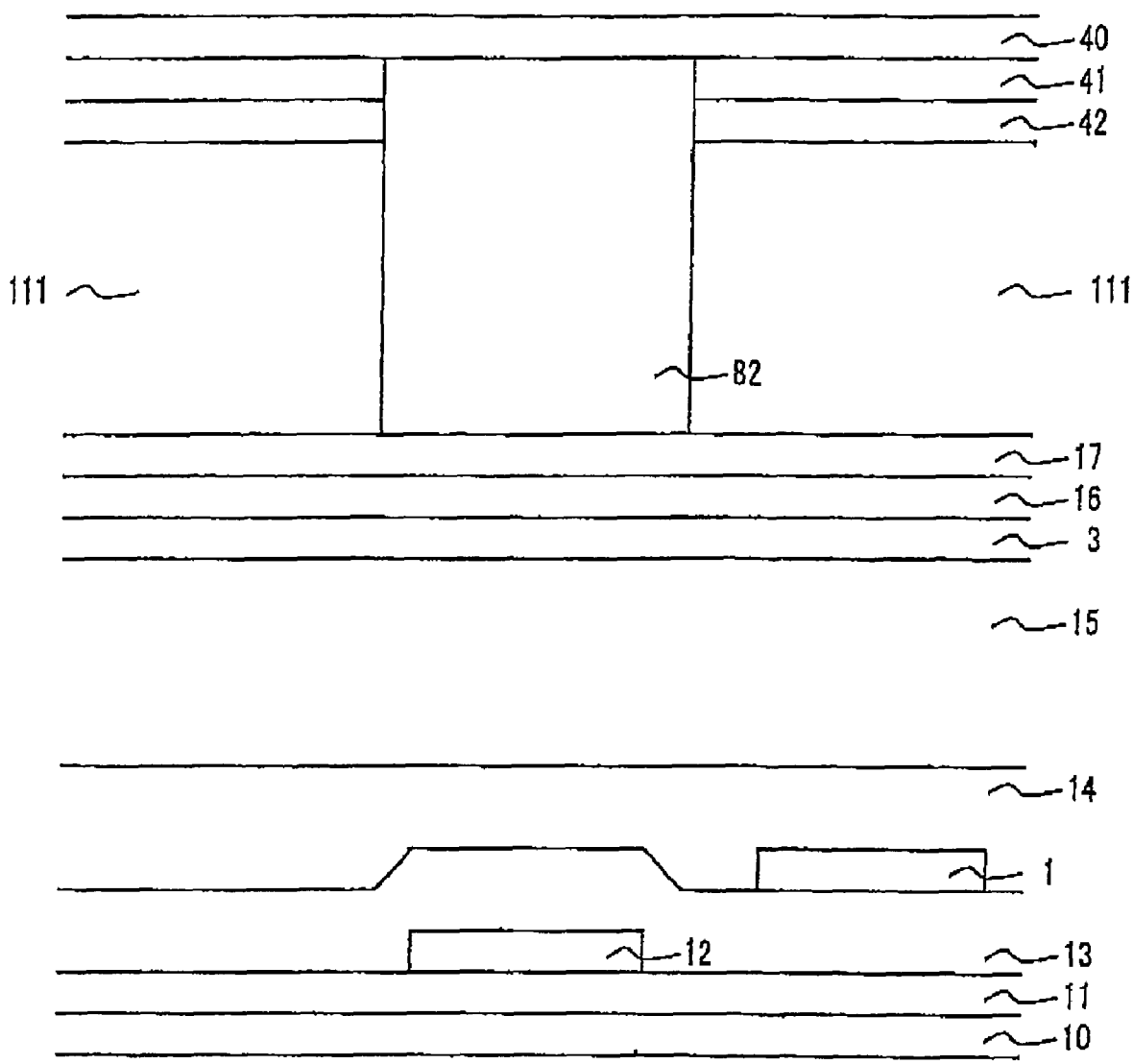
FIG. 26 is a cross-sectional view of an active matrix liquid crystal display apparatus according to Example 3 of the present invention.
Figure 27:
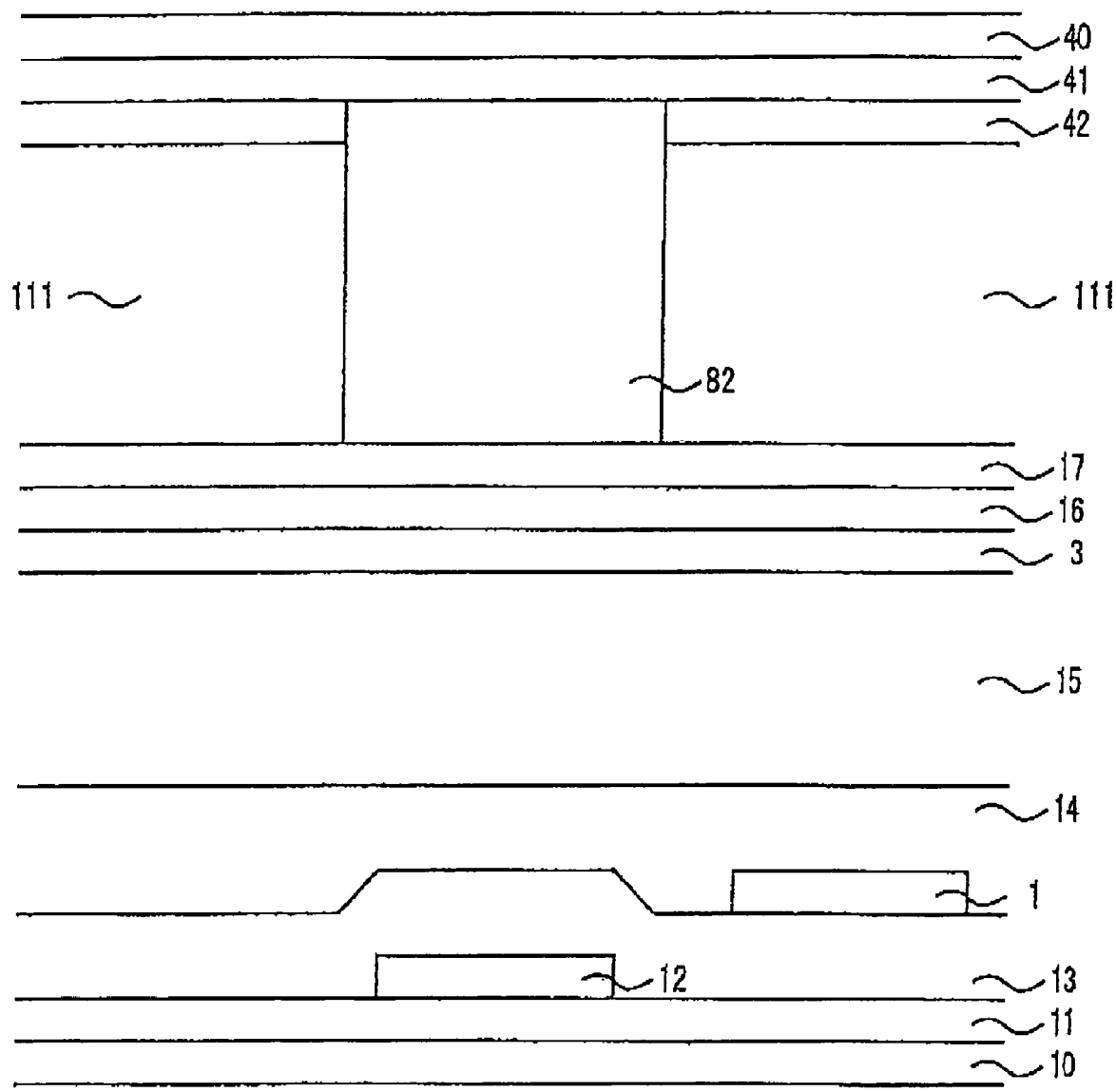
FIG. 27 is a cross-sectional view of a modification of the active matrix liquid crystal display apparatus according to Example 3 of the present invention.

FIGS. 26 and 27 are each a cross-sectional views of an active matrix liquid crystal display apparatus according to Example 3 of the present invention. The cross-sectional views in FIGS. 26 and 27 correspond to the cross-sectional view taken along line C–C' in FIG. 16.

In Example 3, as shown in FIGS. 26 and 27, the spacer member (PS) 82 is provided above the laser radiation portion for cutting (corresponding to the portion C1 in FIG. 16). The spacer member (PS) 82 is provided on the counter substrate (color filter substrate).

In the case where the spacer member (PS) 82 is formed of a resin, the spacer member (PS) 82 is provided by adding an additional step of forming a resin layer to the production method of the counter substrate. This step is added before the counter electrode 41 is formed (FIG. 26; the spacer member (PS) 82 is formed on the glass plate 40) or after the counter electrode 41 is formed (FIG. 27; the spacer member (PS) 82 is formed on the counter electrode 41).

Whether the spacer member (PS) 82 is formed before or after the counter electrode 41 is formed needs to be determined in comprehensive consideration of, for example, the material and cost of the spacer member (PS) 82 and the required time.

In the case where the spacer member (PS) 82 is formed of a resin, the spacer member (PS) 82 can be provided above the laser radiation portion. As in Example 2, although the spacer member (PS) 82 cannot absorb excessive laser power, the spacer member (PS) 82 can prevent the pixel electrode 3 from bulging even when pixel electrode 3 tends to bulge became of excessive laser power. Thus, leaks and other malfunctions are prevented during the melting operation and the cutting operation of laser repair, and thus the efficiency of the laser repair work is improved. The material of the spacer member (PS) 82 is not limited to a resin, and may be other materials, although an additional step is then required.

EXAMPLE 4

When both a melting operation and a cutting operation are performed for repairing a point defect using laser light, it is efficient to perform the cutting operation before the melting operation.

For repairing a point defect of a pixel portion, a melting operation and a cutting operation are performed as one continuous operation. After both melting and cutting are completed, it is checked whether the repair work has been successful, i.e., whether the point defect has been repaired. The repair work is determined to be successful only when both the melting operation and the cutting operation have been successful.

It is efficient to check whether one of the operations which is first performed (the melting operation or the cutting operation) has been successful when that operation is completed. If that operation is not successful, the repair work is terminated and re-performed. The cutting operation has a higher possibility of failure than the melting operation since the cutting operation requires a higher laser power and also requires laser light to be radiated a larger number of times. It can be checked simply with the naked eye whether the cutting operation has been successful. This can be done by checking, from the rear surface of the liquid crystal display apparatus, whether the laser radiation portion (for example, the semiconductor layer) has been cut, i.e., whether there is a space between the elements. It is difficult to check whether the melting operation has been successful with the naked dye, since it is necessary to check whether the layers are electrically connected (i.e., shortcircuited).

For the above reasons, when the malting operation and the cutting operation are both performed, the cutting operation, having a lower possibility of success, is first performed and then the melting operation, requiring a relatively longer time for checking, is performed. This improves the operation efficiency.

EXAMPLE 5

In Examples 1 through 4, active matrix liquid crystal display apparatuses including TFTs having a top gate structure are described. With the top gate structure, a gate electrode (gate metal layer) acting as a control electrode is provided above the semiconductor (e.g., silicon) layer. In Example 5 according to the present invention, an active matrix liquid crystal display apparatus including TFTs having a bottom gate structure will be described. With the bottom gate structure, a gate electrode (gate metal layer) acting as a control electrode is provided below the semiconductor (e.g., silicon) layer. The present invention is applicable to an apparatus having the gate bottom structure. With this structure, the protection layers 8 and 9 and the spacer members (PS) 81 and 82 can be provided above the laser radiation portion. The protection layer 9 and one of the spacer members (PS) 81 and 82 together act as a second protection member.

Figure 28:
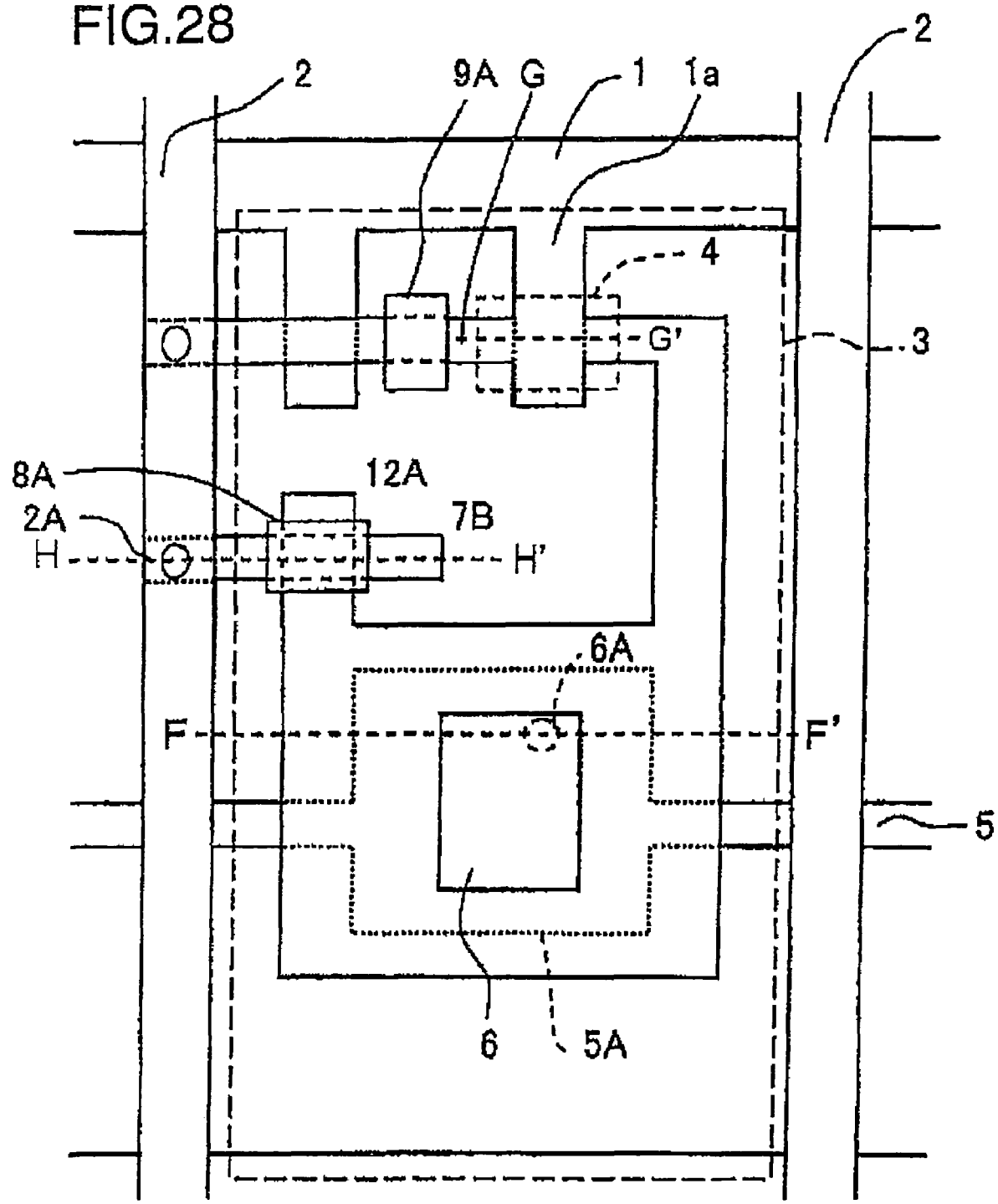
FIG. 28 is a plan view of an active matrix substrate of an active matrix liquid crystal display apparatus according to Example 5 of the present invention having a bottom gate structure.
Figure 29:
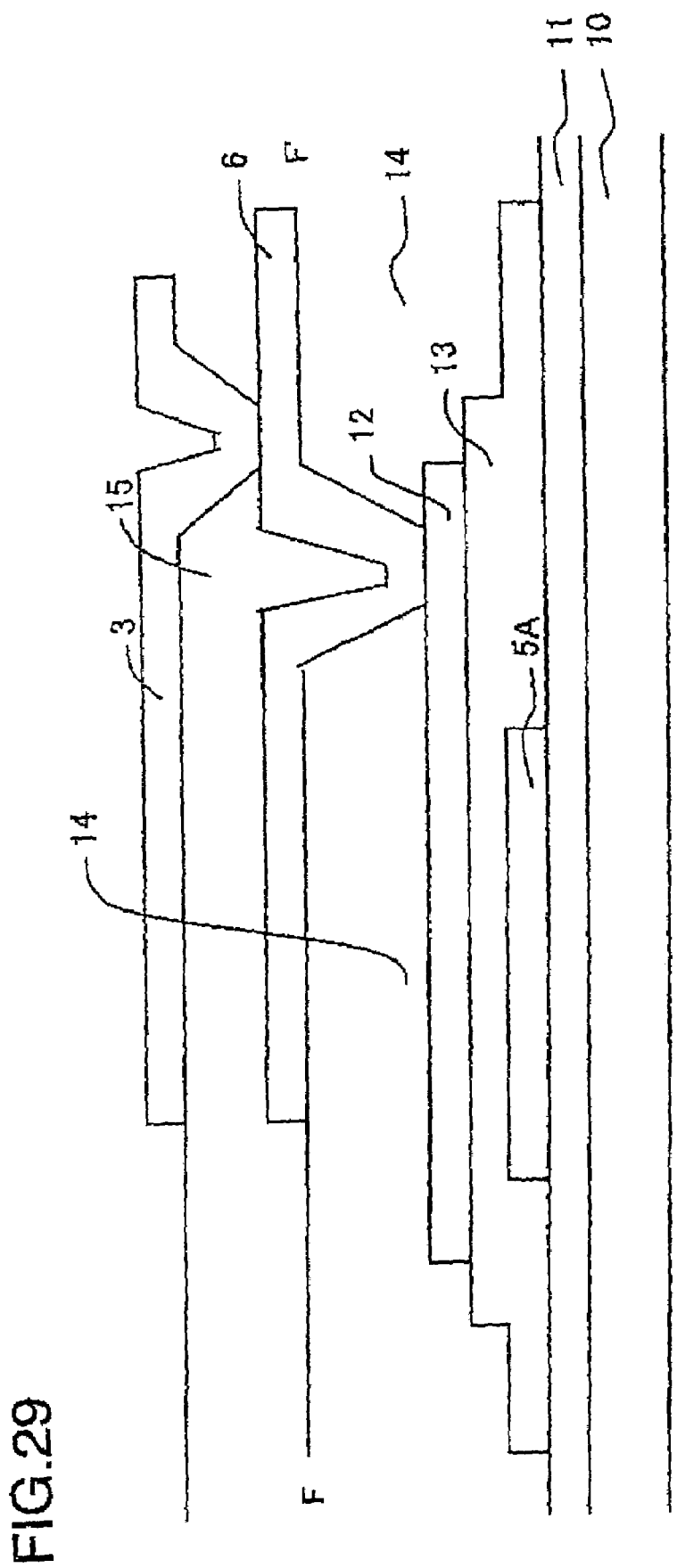
FIG. 29 is a partial cross-sectional view of FIG. 28 taken long line F–F'.
Figure 30:
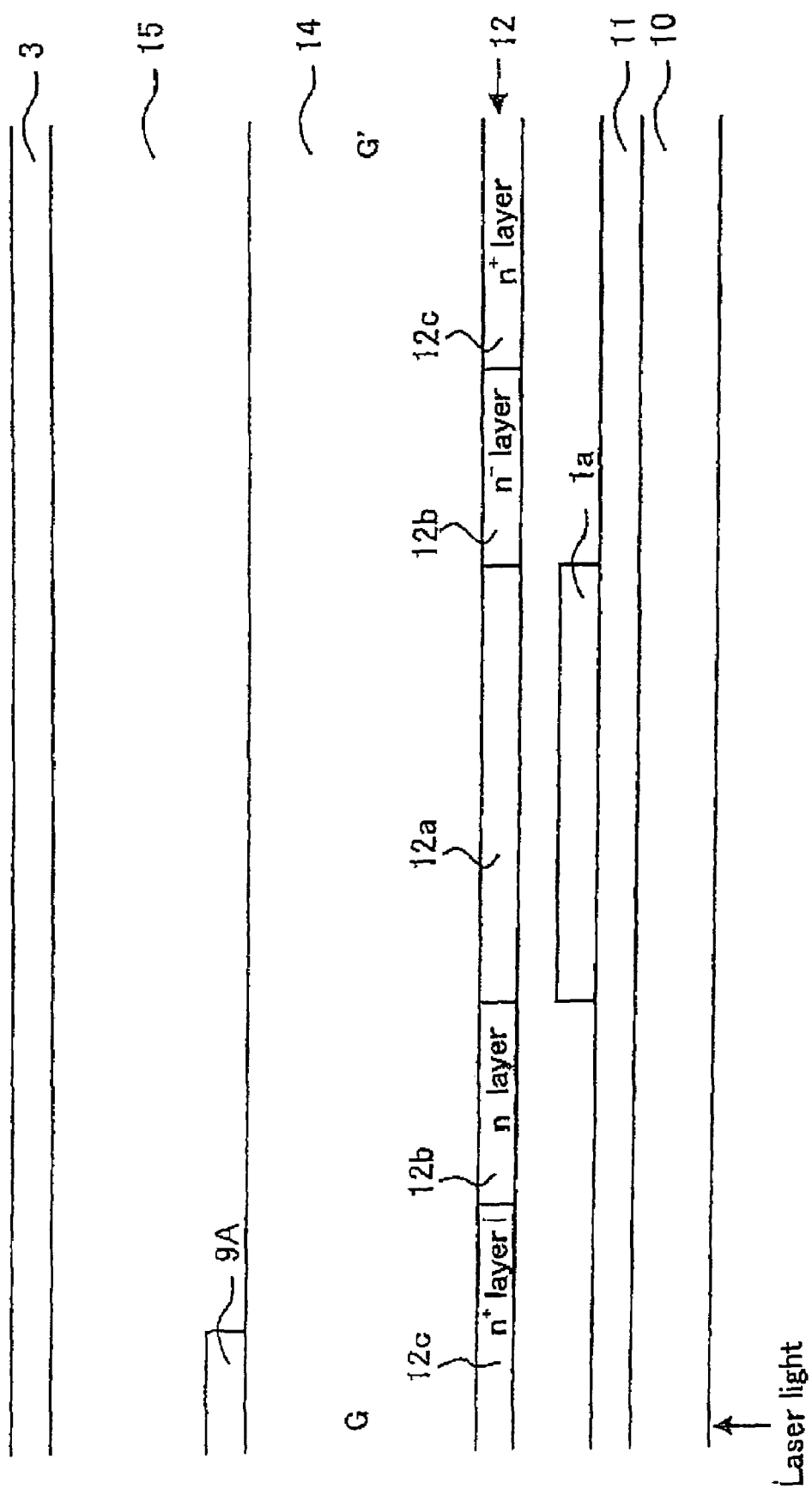
FIG. 30 is a partial cross-sectional view of FIG. 28 taken a long line G–G'.
Figure 31:
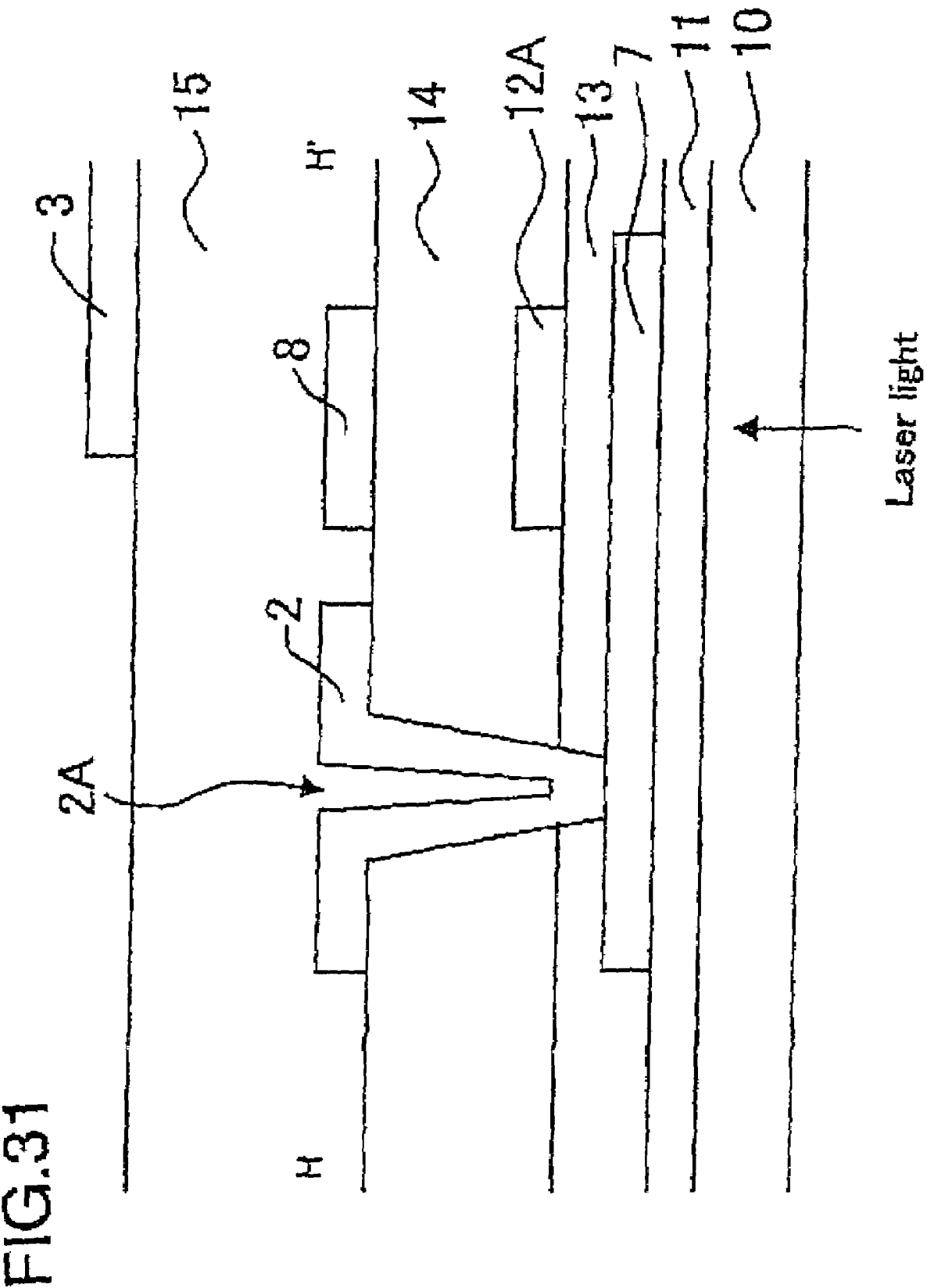
FIG. 31 is a partial cross-sectional view of FIG. 28 taken a long line H–H'.

FIG. 28 is a plan view of a single display unit of an active matrix substrate (TFT substrate) of an active matrix liquid crystal display apparatus having a bottom gate structure. FIG. 29 is a partial cross-sectional view of FIG. 28 taken long line F–F'. FIG. 30 is a partial cross-sectional view of FIG. 28 taken long line G–G'. FIG. 31 is a partial cross-sectional view of FIG. 28 taken long line H–H'.

As shown in FIGS. 28 through 31, the active matrix liquid crystal display apparatus having the bottom gate structure includes a gate metal layer including a gate bus line 1, a storage capacitance bus line 5 and a projected gate metal portion 7B. On the gate metal layer, a semiconductor layer 12 including a drain region and a projected semiconductor (Si) portion 12A is provided. A gate insulating layer 13 is interposed between the gate metal layer and the semiconductor layer 12. Except for these points, the active matrix liquid crystal display apparatus in FIGS. 28 through 31 has the same structure as that of Example 1.

In the active matrix liquid crystal display apparatus in Example 5, a point defect is repaired as follows. The overlapping portion of the projected gate metal portion 7B and the projected semiconductor portion 12A is irradiated with laser light. Thus, the gate insulating layer 13 is destroyed, and the projected gate metal portion 7B and the projected semiconductor portion 12A are shortcircuited.

In the case where a protection layer 8A is provided above the laser radiation portion, the conductive layer is prevented from bulging and places of the conductive material are prevented from being scattered during the melting operation of laser repair.

In the case where a spacer member (PS) 81 or 82 is provided above the laser radiation portion, the conductive layer is prevented from bulging and pieces of the conductive material are prevented from being scattered during the cutting operation of laser repair.

In Examples 1 through 5, a liquid crystal display apparatus using a liquid crystal material as a display medium is described. The present invention is applicable to display apparatuses using an EL light emitting layer or a plasma light emitting element. In Examples 1 through 5, an active matrix liquid crystal display apparatus using a thin film transistor (TFT) as a switching device is described. The present invention is applicable to display apparatuses using an MIM device, a diode, a MOS transistor and the like as a switching device.

In Examples 1 through 5, a YAG laser is used as a source of laser light. The present invention is applicable to display apparatuses using other types of laser light as heat energy.

The elements irradiated with laser light may be formed of a tantalum nitride-tungsten laminate structure, metal materials such as Ta, W, Ti, Mo, Al or Cu, or metal alloys or compounds containing such metal materials as main components. Any material which can be easily shortcircuited, electrically connected, and cut is usable.

In Examples 1 through 5, surfaces of the protection layers 8 and 9 and the spacer members (PS) 81 and 82 which are to be irradiated with laser light are flat. Alternatively, these surfaces may be concaved so as to be opened downward, i.e., opened toward the laser radiation portion. The protection layers 8 and 9 may be colored resin layers. The colored resin layers may be buried in the interlayer insulating layer 14.

In Examples 1, 4 and 5, the protection layers 8 and 9 have a square or rectangular planar shape. The planar shape of the protection layers 8 and 9 may be triangular, pentagonal, hexagonal, or other polygonal shapes effective as guides. The planar shape of the protection layers 8 and 9 may be circular, elliptical, cross-shaped, or other shapes effective as guides. The protection layers 8 and 9 can be used as guides for determining the position of the laser radiation portion. The planar size of the protection layers 8 and 9 may be equal to, or larger than, the size of the laser radiation portion. As long as the size of the protection layers 8 and 9 is equal to or larger than that of the laser radiation portion, it is easy to determine and confirm the size of the laser radiation portion.

In Examples 1 through 5, the semiconductor layer 12 may be formed of polycrystalline silicon.

The present invention is useful in the fields of image display apparatuses including liquid crystal TVs and computer terminal displays. The active matrix substrate, and the display apparatus including the active matrix substrate, according to the present invention can be produced by a simple method and allow a point defect to be repaired with certainty. Thus, the present invention improves the production yield.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active matrix substrate for allowing a point defect of a defect pixel portion, among a plurality of pixel portions arranged two-dimensionally, to be repaired by radiation of energy, wherein the active matrix substrate includes one of:
   a first protection member for absorbing excessive energy power and preventing pieces of a conductive material from being scattered; and a second protection member for preventing pieces of a conductive material from being scattered and for preventing a conductive layer from bulging, wherein:
one of the first protection member and the second protection member is provided above at least one energy radiation portion, each of the plurality of pixel portions includes a switching device and a pixel electrode, and the switching device includes a first driving region connected to a signal line and a second driving region connected to the pixel electrode, the energy radiation portion is a portion to be melted; and in the energy radiation portion, a first layer and a second layer partially overlap each other with an insulating layer interposed therebetween, the first layer being formed of a semiconductor layer including the second driving region of the switching device or a conductive layer connected to the semiconductor layer, and a second layer being formed of a conductive or semiconductor layer connected to the signal line.

2. An active matrix substrate according to claim 1, wherein the at least one energy radiation portion includes a plurality of energy radiation portions.

3. An active matrix substrate according to claim 1, further comprising a plurality of scanning lines arranged parallel to one another and a plurality of signal lines arranged so as to be parallel to one another and so as to cross the plurality of scanning lines;

wherein:
the plurality of pixel electrodes are provided in a matrix respectively at intersections of the plurality of scanning lines and the plurality of signal lines;

and each of the scanning lines is connected to a control region of the corresponding switching device.

4. An active matrix substrate according to claim 1, wherein:
the first layer is a first projected portion projecting from the second driving region of the switching device; and
the second layer is a second projected portion connected to the signal line via a contact hole and projected from the signal line to partially overlap the first projected portion.

5. An active matrix substrate according to claim 4, wherein the first projected portion and the second projected portion project from the overlapping portion by a prescribed distance.

6. An active matrix substrate for allowing a point defect of a defect pixel portion, among a plurality of pixel portions arranged two-dimensionally, to be repaired by radiation of energy, wherein the active matrix substrate includes one of:
a first protection member for absorbing excessive energy power and preventing pieces of a conductive material from being scattered; and
a second protection member for preventing pieces of a conductive material from being scattered and for preventing a conductive layer from bulging, wherein:
one of the first protection member and the second protection member is provided above at least one energy radiation portion, and the energy radiation portion is a portion to be cut, and is a part of the semiconductor layer extending from the switching device to the pixel electrode.

7. An active matrix substrate for allowing a point defect of a defect pixel portion, among a plurality of pixel portions arranged two-dimensionally, to be repaired by radiation of energy, wherein the active matrix substrate includes one of:
a first protection member for absorbing excessive energy power and preventing pieces of a conductive material from being scattered; and
a second protection member for preventing pieces of a conductive material from being scattered and for preventing a conductive layer from bulging, wherein:
one of the first protection member and the second protection member is provided above at least one energy radiation portion, and the at least one of the first protection member and the second protection member is provided above the energy radiation portion and below the pixel electrode which is provided in each of the plurality of pixel portions.

8. An active matrix substrate for allowing a point defect of a defect pixel portion, among a plurality of pixel portions arranged two-dimensionally, to be repaired by radiation of energy, wherein the active matrix substrate includes one of:
a first protection member for absorbing excessive energy power and preventing pieces of a conductive material from being scattered; and
a second protection member for preventing pieces of a conductive material from being scattered and for preventing a conductive layer from bulging, wherein:
one of the first protection member and the second protection member is provided above at least one energy radiation portion, and a surface of at least one of the first protection member and the second protection member which is irradiated with energy is concaved so as to be opened toward the energy radiation portion.

9. An active matrix substrate according to claim 1, wherein the second protection member is a spacer member for preventing the pieces of the conductive material from being scattered and for preventing the conductive layer from bulging.

10. An active matrix substrate according to claim 2, wherein:
the second protection member includes a protection layer for preventing the pieces of the conductive material from being scattered and for preventing the conductive layer from bulging and a spacer member for preventing the pieces of the conductive material from being scattered and for preventing the conductive layer from bulging; and
the spacer member is projected from a top surface of the active matrix substrate by a prescribed distance.

11. An active matrix substrate according to claim 1, wherein the switching device is one of a thin film transistor, an MIM device, a MOS transistor, and a diode.

12. An active matrix substrate according to claim 11, wherein the thin film transistor is a polycrystalline thin film transistor using polycrystalline silicon as the semiconductor layer.

13. An active matrix substrate according to claim 11, wherein the thin film transistor has a top gate structure having a control region above a channel region with an insulating layer interposed therebetween.

14. An active matrix substrate according to claim 11, wherein the thin film transistor has a top gate structure having a control region below a channel region with an insulating layer interposed therebetween.

15. An active matrix substrate according to claim 1, wherein at least one of the first protection member and the second protection member is formed of the same metal layer as that of a scanning line or a signal line respectively.

16. An active matrix substrate according to claim 1, wherein at least one of the first protection member and the second protection member is formed of a colored resin layer.

17. An active matrix substrate according to claim 1, wherein at least one of the first protection member and the second protection member has a planar shape being one of a square shape, a rectangular shape, a circular shape, an elliptical shape, a polygonal shape, and a cross-shape.

18. An active matrix substrate according to claim 1, wherein at least one of the first protection member and the second protection member has a planar size which is equal to, or larger than the planar size of an energy radiation portion.

19. A display apparatus, comprising:
an active matrix substrate according to claim 1; and
a counter substrate facing the active matrix substrate with a display medium interposed between the active matrix substrate and the counter substrate, the counter substrate having a counter electrode facing the plurality of pixel electrodes of the active matrix substrate;
wherein the display medium is driven by a display signal applied between the pixel electrode and the counter electrode to display an image, and
wherein when at least one of a plurality of pixel portions each having a pixel electrode is a defect pixel portion, an energy radiation portion of the defect pixel portion is irradiated with energy to perform at least one of a melting operation and a cutting operation.

20. A display apparatus according to claim 19, wherein the display medium is one of a liquid crystal material, an EL light emitting layer, and a plasma light emitting element.

21. A display apparatus according to claim 19, wherein a spacer member for preventing the pieces of the conductive material from being scattered and for preventing the conductive layer from bulging is provided as a second protection member on one of the active matrix substrate and the counter substrate.

22. A display apparatus according to claim 19, wherein the display apparatus is one of a transmission type, a reflection type, and a semi-transmission type having a transmission mode and a reflection mode.

23. A method for producing a display apparatus according to claim 19, comprising the steps of:
applying a prescribed signal, from the scanning line and the signal line of the display apparatus, between the pixel electrode and the counter electrode of the display apparatus, thereby detecting a point defect of the pixel portion; and
irradiating an energy radiation portion of the defect pixel portion, in which the point defect is detected, with energy from outside of the display apparatus, thereby performing at least one of a melting operation and a cutting operation.

24. A method according to claim 23, wherein the step of irradiating includes the step of irradiating a corner of an area which includes an overlapping portion of a first projected portion and a second projected portion and also includes portions projecting from the overlapping portion.

25. A method according to claim 23, wherein laser light is used as the energy.

26. A method according to claim 25, wherein at least one of the first protection member and the second protection member is used as a guide for determining the position of the laser irradiation portion.

27. A method according to claim 25, wherein the planar size of a protection layer, being at least one of the first protection member and the second protection member, is used as a guide for confirming the size of the laser irradiation portion.

28. A method according to claim 25, wherein when the melting operation and the cutting operation are both performed, the cutting operation is performed before the melting operation.

* * * * *